US010102732B2

(12) United States Patent
Gersten

(10) Patent No.: US 10,102,732 B2
(45) Date of Patent: Oct. 16, 2018

(54) DANGER MONITORING SYSTEM

(71) Applicant: Infinite Designs, LLC, Phoenix, AZ (US)

(72) Inventor: Adam Gersten, Phoenix, AZ (US)

(73) Assignee: INFINITE DESIGNS, LLC, Phoenix, AZ (US)

( * ) Notice: Subject to any disclaimer, the term of this patent is extended or adjusted under 35 U.S.C. 154(b) by 0 days.

(21) Appl. No.: 15/795,988

(22) Filed: Oct. 27, 2017

(65) Prior Publication Data
US 2018/0053394 A1 Feb. 22, 2018

Related U.S. Application Data

(63) Continuation-in-part of application No. 15/635,034, filed on Jun. 27, 2017.
(Continued)

(51) Int. Cl.
H04M 11/00 (2006.01)
G08B 21/10 (2006.01)
(Continued)

(52) U.S. Cl.
CPC ......... *G08B 21/10* (2013.01); *G01C 21/3641* (2013.01); *G01C 21/3647* (2013.01);
(Continued)

(58) Field of Classification Search
CPC G08B 21/10; G08B 21/182; G08B 13/19695; G08B 17/08; G08B 21/02;
(Continued)

(56) References Cited

U.S. PATENT DOCUMENTS 6,028,514 A 2/2000 Lemelson et al.
7,855,935 B1 12/2010 Lauder et al.
(Continued)

FOREIGN PATENT DOCUMENTS

TW 20130144065 6/2015

OTHER PUBLICATIONS

Tracking Gunfire With a Smartphone: http://news.vanderbilt.edu/2013/04/tracking-gunfire-with-smartphone/, Author: David Salisbury, date: Apr. 25, 2013.
(Continued)

Primary Examiner — Stella L. Woo
(74) Attorney, Agent, or Firm — Booth Udall Fuller, PLC

(57) ABSTRACT

A danger monitoring system is disclosed. A danger monitoring device comprises a microphone configured to continuously digitize environmental sound, a first memory, a first processor configured to determine whether a stored interval meets a threshold criteria for a dangerous event, and a first network interface configured to send a danger observation data to a server. The danger monitoring server comprises a second memory, a second processor configured to verify the dangerous event digitized by the danger monitoring device and determine an event location of the verified dangerous event, and a second network interface configured to send a danger alert. A danger mitigation device comprises a third network interface configured to receive the danger alert, a GPS receiver, a screen, a third memory comprising map data, and a third processor configured to render a map indicating at least a current location of the danger mitigation device, and the event location.

22 Claims, 23 Drawing Sheets

Related U.S. Application Data

(60) Provisional application No. 62/355,768, filed on Jun. 28, 2016.

(51) Int. Cl.

| | | |
|---|---|---|
| *H04R 29/00* | (2006.01) | |
| *G08B 17/08* | (2006.01) | |
| *G08B 13/196* | (2006.01) | |
| *G01C 21/36* | (2006.01) | |
| *H04N 5/91* | (2006.01) | |
| *H04R 1/32* | (2006.01) | |
| *G11B 27/10* | (2006.01) | |
| *G08B 21/18* | (2006.01) | |
| *G08B 21/02* | (2006.01) | |
| *G08B 25/10* | (2006.01) | |
| *H04M 1/725* | (2006.01) | |
| *H04N 5/765* | (2006.01) | |
| *H04N 5/77* | (2006.01) | |
| *H04N 7/18* | (2006.01) | |
| *H04N 9/82* | (2006.01) | |
| *H04W 4/02* | (2018.01) | |
| *G06F 9/451* | (2018.01) | |

(52) U.S. Cl.
CPC ....... *G06F 9/453* (2018.02); *G08B 13/19695* (2013.01); *G08B 17/08* (2013.01); *G08B 21/02* (2013.01); *G08B 21/182* (2013.01); *G08B 25/10* (2013.01); *G11B 27/10* (2013.01); *H04M 1/72538* (2013.01); *H04N 5/765* (2013.01); *H04N 5/772* (2013.01); *H04N 5/91* (2013.01); *H04N 7/185* (2013.01); *H04N 7/188* (2013.01); *H04N 9/8205* (2013.01); *H04R 1/326* (2013.01); *H04R 29/00* (2013.01); *H04W 4/023* (2013.01); *H04M 1/72572* (2013.01)

(58) Field of Classification Search
CPC ............ G08B 21/0202; G08B 21/0205; G08B 21/0208; G08B 21/0288; G01C 21/3641; G01C 21/3647; G11B 27/10; H04R 1/326; H04R 29/00; H04N 5/91
USPC ......... 379/37–45; 340/539–545; 455/404.01, 455/404.02
See application file for complete search history.

(56) References Cited

U.S. PATENT DOCUMENTS

| | | |
|---|---|---|
| 9,390,607 B2 | 7/2016 | Bell et al. |
| 2005/0225443 A1 | 10/2005 | Lerg |
| 2008/0162133 A1* | 7/2008 | Couper ............. G08B 13/1672 704/239 |
| 2009/0273682 A1 | 11/2009 | Shekarri et al. |
| 2011/0169633 A1 | 7/2011 | Lauder et al. |
| 2012/0063270 A1* | 3/2012 | Angell ............... G01S 5/0027 367/127 |
| 2012/0229275 A1* | 9/2012 | Mattern ................. G01S 5/18 340/540 |
| 2013/0040596 A1 | 2/2013 | Paim et al. |
| 2013/0222133 A1* | 8/2013 | Schultz ................ G08G 1/205 340/539.13 |
| 2014/0327543 A1 | 11/2014 | Showen et al. |
| 2014/0361886 A1 | 12/2014 | Cowdry |
| 2015/0002293 A1 | 1/2015 | Nepo |
| 2015/0081296 A1* | 3/2015 | Lee ......................... G10L 15/20 704/239 |
| 2015/0111524 A1 | 4/2015 | South |
| 2015/0194045 A1 | 7/2015 | Edwards et al. |
| 2015/0249904 A1 | 9/2015 | Weiss et al. |
| 2015/0269835 A1* | 9/2015 | Benoit ................ G08B 25/016 340/539.13 |
| 2015/0330805 A1* | 11/2015 | Cho ........................ H04W 4/02 701/428 |
| 2015/0347079 A1 | 12/2015 | Price et al. |
| 2016/0070010 A1* | 3/2016 | Calupca ............... A01M 31/002 367/14 |
| 2016/0157032 A1* | 6/2016 | Kane ...................... H04R 3/00 381/56 |
| 2017/0156028 A1* | 6/2017 | Kim ....................... H04L 43/16 |
| 2017/0237950 A1 | 8/2017 | Araya et al. |
| 2017/0311131 A1* | 10/2017 | South ..................... H04W 4/04 |

OTHER PUBLICATIONS

NYPD to Detect Gunshots in Real Time: http://www.msnbc.com/msnbc/nypd-detect-gunshots-real-time, Publication Date: Mar. 17, 2015.

Could Your Smartphone Help Police Track Gunfire?: http://www.citylab.com/tech/2013/04/your-smartphone-could-help-police-track-gunfire/5430/, Author: Emily Badger, Date: Apr. 29, 2013.

* cited by examiner

DANGER MONITORING SYSTEM

RELATED APPLICATIONS

This application claims priority to U.S. patent application Ser. No. 15/635,034, filed Jun. 27, 2017 titled "Danger Detection System", which claims the benefit of U.S. Provisional Patent Application No. 62/355,768, filed Jun. 28, 2016 and titled "GUNSHOT DETECTION SYSTEM," the entireties of both of which are incorporated herein by this reference.

TECHNICAL FIELD

Aspects of this document relate generally to danger monitoring systems.

BACKGROUND

There are various types of dangerous situations and events that occur where a gun is utilized. Often times victims and bystanders are unsure as to what is occurring and do not have the needed information to appreciate their proximity to a dangerous situation or how they might reach shelter or a safer place. Conventional gunshot detection systems make use of a network of stationary microphones, sometimes sophisticated directional microphones, spread across the area being monitored. The location of a gunshot may be determined by comparing when the shot was heard by various stationary microphones, or by triangulation using directional information from a few more sophisticated directional microphones. A large number of stationary microphones must be deployed to obtain accurate location information, an infrastructure that can be very expensive to deploy and maintain. Unless expensive redundancy is built in, the failure of only a handful of devices can render the system "blind" in an area. The use of directional microphones can reduce the number of devices needed, but can increase the cost of installation and maintenance. Furthermore, conventional systems must be deployed to account for population centers averaged over a day. For example, one part of a city may have more activity (and more crime) during the daytime, and another part of the city may become more active at night. Because conventional systems make use of stationary microphones, both of those areas would need to be covered. Additionally, conventional systems typically only provide information to law enforcement, and do not directly assist the public in avoiding dangerous situations or active shooters.

SUMMARY

According to one aspect, a danger monitoring system includes a first danger monitoring device communicatively coupled to a network. The first danger monitoring device includes a microphone configured to continuously digitize environmental sound, and a first memory storing an interval of the most recently digitized environmental sound as well as storing a location identifier associated with the location of the danger monitoring device. The first danger monitoring device also includes a first processor configured to determine whether the stored interval of digitized sound meets a threshold criteria for a dangerous event, and a first network interface configured to send a first danger observation data generated in response to a determination that the stored interval of digitized sound meets the threshold criteria. The first danger observation data includes an audio data associated with a digitized dangerous event, a timestamp associated with the event, and the location identifier. The danger monitoring system also includes a danger monitoring server communicatively coupled to the network. The danger monitoring server includes a second memory storing the first danger observation data received by the danger monitoring server from the first danger monitoring device, the first danger observation data being stored among a plurality of danger observation data in the second memory. The danger monitoring server also includes a second processor configured to verify the dangerous event digitized by the first danger monitoring device by comparing the audio data of the first danger observation data with the audio data of any danger observation data of the plurality of danger observation data whose timestamp has a proximity with the timestamp of the first danger observation data within a temporal threshold, and determine an event location of the verified dangerous event using the location identifiers and timestamps of the first danger observation data and any danger observation data of the plurality whose temporal proximity is within the temporal threshold and whose audio data is similar to the audio data of the first danger observation data. The danger mitigation server further includes a second network interface configured to send a danger alert comprising the event location and an event timestamp. Lastly, the danger monitoring system includes a danger mitigation device communicatively coupled to the network. The danger mitigation device includes a third network interface configured to receive the danger alert from the danger monitoring server, a GPS receiver, a screen, a third memory comprising map data, and a third processor configured to render a map on the screen. The map indicates at least a current location of the danger mitigation device, and the event location.

Particular embodiments may comprise one or more of the following features. The first danger monitoring device may be a mobile device. The microphone of the first danger monitoring device may continuously digitize environmental sound in response to a daemon. The first danger monitoring device may also be the danger mitigation device. The threshold criteria for a dangerous event may be, at least in part, whether the intensity of the environmental sound exceeded a threshold sound intensity during the interval. The threshold sound intensity may be adjusted before a determination is made regarding the interval. The adjustment may be based upon at least one of an orientation of the first danger monitoring device as determined by an accelerometer, and an ambient light level observed by a photosensor of the first danger monitoring device. The threshold criteria for a dangerous event may be, at least in part, whether the stored interval of digitized sound correlates with at least one of a plurality of digitized sounds stored in the first memory, each of the plurality associated with a different type dangerous event. The audio data of the first danger observation data may be an acoustic fingerprint of the interval of digitized environmental sound. The danger mitigation device may be further configured to display navigation information based upon the map data, the current location of the danger mitigation device, and the event location. The navigation information may be generated by the third processor to reduce danger to a user of the danger mitigation device due to proximity to the dangerous event. The danger mitigation device may further comprise a camera, and the navigation information may be presented in the form of augmented reality. The navigation information displayed on the screen of the danger mitigation device may include an avatar chosen from a plurality of avatars and may be based, at least in part, upon at least one of a specified age of the user and a specified limitation of the user. The navigation information may be generated by the third processor by determining a path that shields a user of the danger mitigation device from direct line-of-sight with the event location, using at least one structure identified by the map data stored in the third memory. The danger mitigation device may be configured to display a graphical indicator of a bearing and a distance to the event location relative to the current location of the danger mitigation device. The first danger monitoring device may be a stationary sound monitoring device, the location identifier may be a device identifier, and the danger monitoring server may comprise a device table correlating a plurality of device identifiers with physical locations of a plurality of stationary sound monitoring devices. The danger monitoring server may be unaware of an identity of a user of the first danger monitoring device. The first danger observation data may further comprise a user identifier. The second memory of the danger monitoring server may further comprise an identity table associating each of a plurality of user identifiers with one or more emergency contacts. The second network interface of the danger monitoring server may be further configured to send a status notification to the one or more emergency contacts associated with the user of the danger mitigation device. The status notification may comprise a summary of the dangerous event, the timestamp, the event location, and a current status of the user. Finally, the system may further include a civil infrastructure gateway device communicatively coupled to the danger monitoring server. The civil infrastructure gateway device may be configured to instruct one or more machine-controllable pieces of civil infrastructure located proximate the event location to perform a predefined operation in response to the receipt of the danger alert.

According to another aspect of the disclosure, a danger monitoring system includes a first danger monitoring device communicatively coupled to a network. The first danger monitoring device includes a microphone configured to continuously digitize environmental sound, and a first memory storing an interval of the most recently digitized environmental sound, and storing a location identifier associated with the location of the first danger monitoring device. The first danger monitoring device also includes a first processor configured to determine whether the stored interval of digitized sound meets a threshold criteria for a dangerous event, and a first network interface configured to send a first danger observation data generated in response to a determination that the stored interval of digitized sound meets the threshold criteria. The first danger observation data includes an audio data associated with a digitized dangerous event, a timestamp associated with the event, and the location identifier. The danger monitoring system also includes a danger monitoring server communicatively coupled to the network. The danger monitoring server includes a second memory storing the first danger observation data received by the danger monitoring server from the first danger monitoring device, the first danger observation data being stored among a plurality of danger observation data in the second memory. The danger monitoring server also includes a second processor configured to verify the dangerous event digitized by the first danger monitoring device by comparing the audio data of the first danger observation data with the audio data of any danger observation data of the plurality of danger observation data whose timestamp has a proximity with the timestamp of the first danger observation data within a temporal threshold, and determine an event location of the verified dangerous event using the location identifiers and timestamps of the first danger observation data and any danger observation data of the plurality whose temporal proximity is within the temporal threshold and whose audio data is similar to the audio data of the first danger observation data. The danger monitoring server further includes a second network interface configured to send a danger alert comprising the event location and an event timestamp. The danger monitoring system further includes a danger mitigation device communicatively coupled to the network. The danger mitigation device includes a third network interface configured to receive the danger alert from the danger monitoring server, a screen, a GPS receiver, a third memory comprising map data, and a third processor configured to render a map on the screen. The map indicates at least a current location of the danger mitigation device, and the event location. The danger monitoring system also includes a video recording device communicatively coupled to the danger monitoring server. The video recording device includes a camera, a fourth processor, a fourth memory, and a fourth network interface. The video recording device begins retaining recorded video in the memory in response to the danger alert.

Particular embodiments may comprise one or more of the following features. The threshold criteria may be a range of sound intensity associated with events having the potential to escalate a conflict involving emergency services. The video recording device may begin retaining recorded video in response to a signal transmitted by an emergency services radio proximate the video recording device. The video recording device may be communicatively coupled to the danger monitoring server through the emergency services radio. The video recording device may also be the first danger monitoring device. The video recording device may begin retaining recorded video in the memory in response to a determination by the first processor that the threshold criteria has been met. Lastly, the video recording device may be a bodycam.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f). To the contrary, if the provisions of 35 U.S.C. § 112(f) are sought to be invoked, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The written description is made in conjunction with the appended drawings, where like designations denote like elements, and.

DETAILED DESCRIPTION

Figure 1:
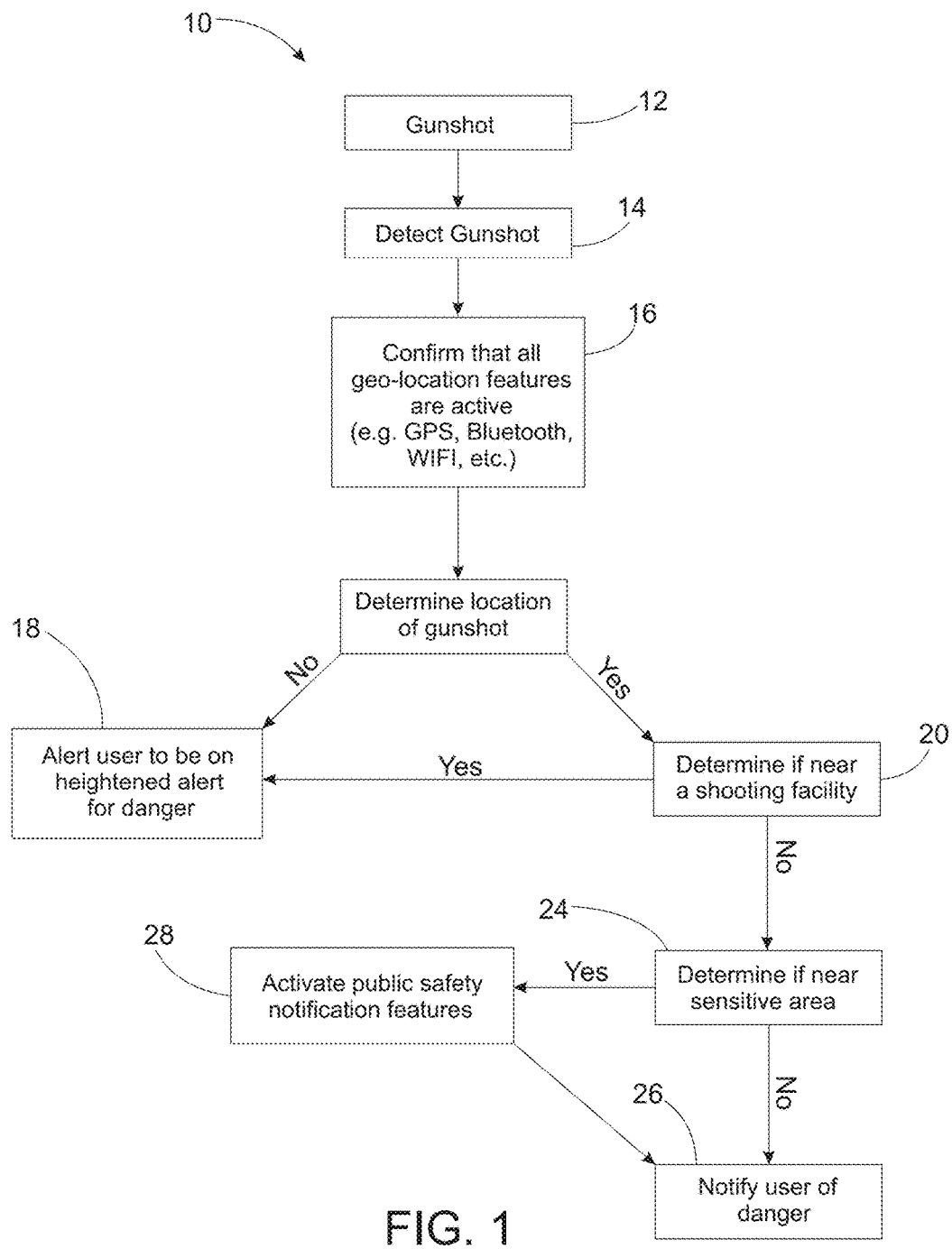
FIG. 1 is a flow chart of a method of using a danger detection system on a mobile device, in accordance with embodiments.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise one or more of any components, models, types, materials, versions, quantities, or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

As discussed above, various embodiments of a danger detection system may be implemented as a system-level mobile OS feature that uses a mobile device's microphones to continually listen for the acoustic fingerprint of a gunshot. Upon detecting a gunshot the mobile device operates a mobile application providing instruction to use its microphones and process the information received from the microphones to determine the approximate distance of the gunshot from the device, and the direction of the gunshot in relation to the device. If the distance is determined to be within an preset distance, such as, but not limited to approximately 200 m, and the gunshot did not appear to originate from the vicinity of an authorized shooting facility, the device will incessantly attract the user's attention (e.g., vibrating, flashing screen, alarm tone, etc.), and use geolocation information along with mapping data to determine and display an approximate location of the gunshot relative to the user and provide graphical direction to the user of possible "safe" or shelter locations to escape to from the gunfire. Additionally, a plurality of danger detection system enabled mobile devices will anonymously work in concert to help create real-time databases of "danger spots" to more accurately determine the location of gunshots and help other nearby mobile devices better protect and warn users.

Referring to the drawings, FIG. 1 depicts a flow chart of a method 10 of using a danger detection system, in accordance with embodiments. The method 10 begins with a gunshot (Step 12). The method 10 includes the system automatically detecting a gunshot (Step 14); and automatically determining a location of the gunshot (Step 16).

Step 16 of determining a location of the gunshot may further include automatically calculating a distance between the location of the gunshot and a mobile device operating the danger detection system. The method 10 may then include automatically determining if the gunshot location is within a predetermined distance of the mobile device, such as, but not limited to 200 m. If the gunshot is not within the preset distance, the method 10 includes the system alerting the user to be on heightened alert for danger (Step 18). If the gunshot is within the preset distance, the method 10 includes determining if the mobile device is near an authorized shooting facility (Step 20).

If the mobile device is near a shooting facility, then the system alerts the user to be on heightened alert for danger (Step 18). If the gunshot is not near a shooting facility, the method 10 includes determining whether all geolocation features of the mobile device are activated (Step 22). The method 10 then includes determining whether the mobile device is near a sensitive area (Step 24). If the mobile device is near a sensitive area, the method 10 includes activating public safety notification features (Step 28). If the mobile device is not near a "sensitive area," the method 10 includes notifying the user of danger (Step 26).

Embodiments of the danger detection system may also be used to aid law enforcement in detecting and responding appropriately to active shooter scenarios, by locating bystanders/potential victims in relation to gunshots. This allows 911 operators to more intelligently advise bystanders about where they might safely "shelter in place." Meanwhile, police and dispatchers can respond more intelligently to an active shooter scenario by leveraging the sound data collection capabilities of nearby smartphones and other devices running an OS that features the danger detection system.

The danger detection system may include a mapping function that may be integrated with various indoor mapping technologies, to help people in potential hostage situations to find shelter, such as "safe" or "safer" escape routes and locations to wait, for bystanders and potential victims inside of buildings themselves. These shelters and escape routes may include routes to buildings, facilities or locations that have security, including police stations, fire stations, hospitals, government buildings, or other suitable locals. Various embodiments may include information stored in order to provide prioritized shelters for a user to seek security in. These shelters or shelter places may include listings of places, locations, buildings, or facilities with a continual or regular security presence. Further, if the danger detection system is programmed to be able to differentiate the sounds of different gunshots, this information can be conveyed to law enforcement to better identify and more quickly resolve active shooter situations (e.g., if the gunshot came from a cartridge that has typically been used in hunting rifles, then law enforcement has information to better estimate how many shots a suspect could fire in a set amount of time and how often the shooter would need to reload, whereas, if the gunshot was from a 7.62×39, it most likely was fired from an AK-47 or SKS type rifle, meaning both larger capacity and a greater rate of fire).

Figure 2:
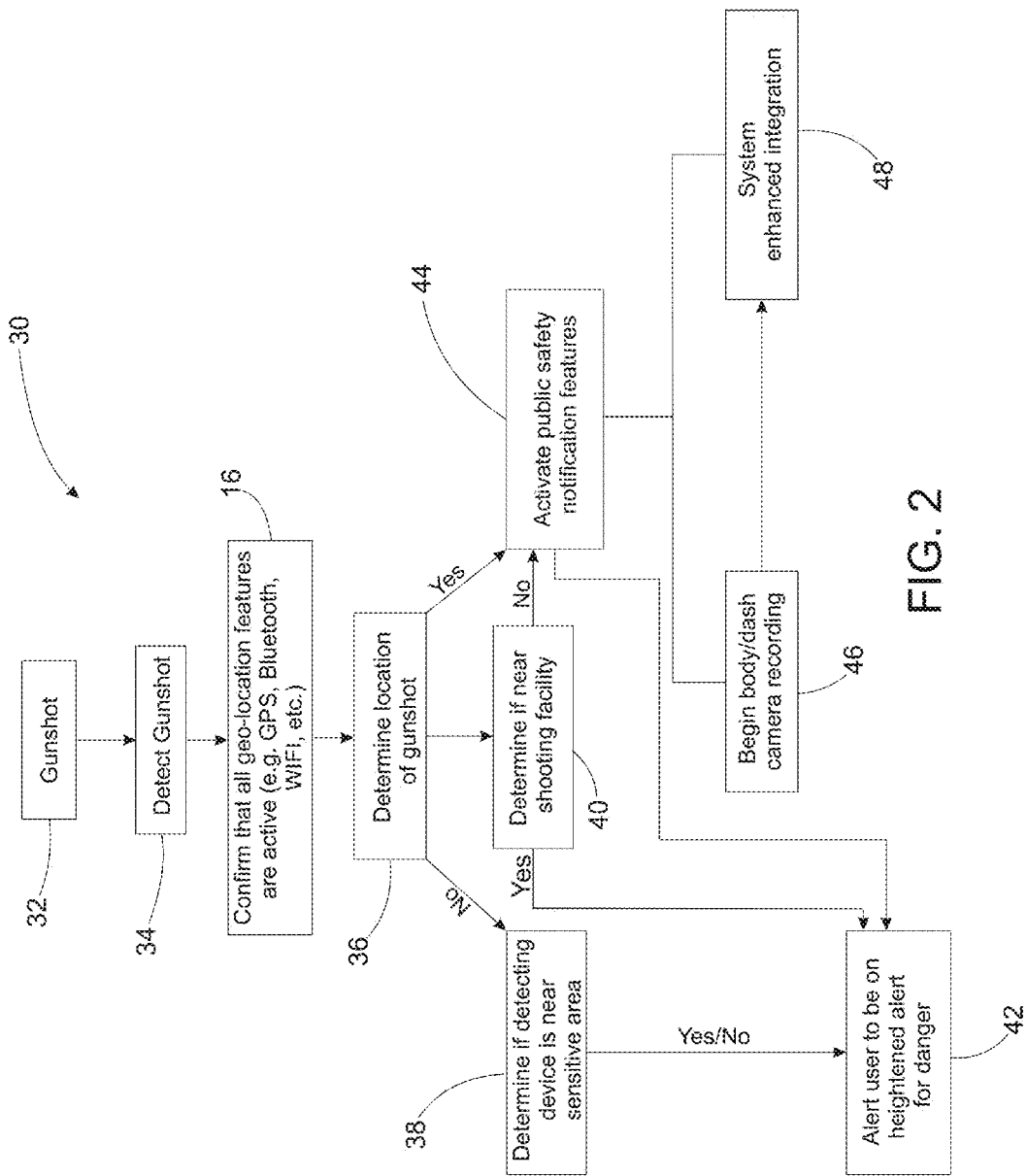
FIG. 2 is a flow chart of a method of using a danger detection system equipped law enforcement body or dashboard camera, in accordance with embodiments.

Referring further to the drawings, FIG. 2 depicts a particular embodiment that may be utilized by law enforcement and the like, wherein the users have a mobile device, such as, but not limited to a body camera. In these embodiments, the police body cameras may be equipped with a danger detection system. FIG. 2 depicts a flow chart of a method 30 of using a body camera equipped with a danger detection system, in accordance with embodiments. The method 30 begins with a gunshot (Step 32). The method 30 includes the system automatically detecting a gunshot (Step 34); and automatically determining a location of the gunshot (Step 36). Step 36 of determining a location of the gunshot may further include automatically calculating a distance between the location of the gunshot and a body camera operating the danger detection system. The method 30 may then include automatically determining if the gunshot location is within a preset distance of the body camera, such as, but not limited to 200 m.

If the gunshot is not within the predetermined distance, the method 30 includes the system alerting the user to be on heightened alert for danger (Step 38). If the gunshot is within the predetermined distance, the method 30 includes determining if the body camera is near an authorized shooting facility (Step 40) and activates public safety notification features (Step 44). If the body camera is near a shooting facility, then the system alerts the user to be on heightened alert for possible danger (Step 42). If the gunshot is not near a shooting facility, the method 30 continues with Step 44 of activating public safety notification features. Step 44 of activating public safety notification features includes beginning body/dashboard camera recording (Step 46) and activating system enhanced integration (Step 48). Step 48 of activating enhanced integration may include localized area illumination, localized surveillance optimization, traffic signal override and the like.

In the embodiment depicted in FIG. 2, the system may include additional functionality, such as but not limited to creation of metadata tags pinpointing the distance and direction of the gunshot with respect to the officer's body camera, and with the integration of gyroscopic sensors and accelerometers in the body camera, the orientation of the officer with respect to the gunshot, which way the officer was facing, as well as how they moved in response to the detected gunshot, all of which may be recorded by the body camera of the system.

In some embodiments of a body camera equipped with the danger detection system, certain tonal changes that occur when voices are raised, may be identified by the danger detection system and the system may activate the body camera to start recording. When the system detects changes in speech indicative of raised voices, the camera will be more likely to record the sort of police-public encounters that often result in the use of force. This information and video recording may be a valuable piece of evidence to determine how such encounters take place, and whether the appropriate amount of force was utilized by the officer in this situation, and further to serve as evidence as to the behavior of the other person(s) involved in the encounter. It will be understood that the function of the body camera of recording and storing the video operates in a manner of conventional body cameras.

Referring back to FIG. 2 and Step 48 of activating enhanced integration, one aspect is optimizing localized surveillance. For example, and without limitation, red light cameras and other municipal surveillance cameras, equipped with microphones and running the danger detection system may, upon detection of a gunshot, immediately throw a "spotlight" on the area where the shot originated by increasing localized streetlight brightness or the like. Additionally, municipal cameras in the immediate area (surveillance cameras, red-light cameras, photo radar cameras, etc.) may automatically adjust their settings to optimize clear recordings of the area surrounding where the shot originated (e.g., pan-tilt-zoom, focus, infrared-mode, and increasing framerate in variable frame rate cameras).

Additionally, danger detection system equipped body cameras and dashboard cameras, possessing mobile communications capabilities, can similarly activate this protocol for increased illumination when a dashboard camera or an officer's body camera activates to the sound of a gunshot. In law enforcement deadly-force encounters occurring at night, law enforcement would be aided by more light, not less. With a greater amount of light shining upon both the police and the suspect, there would be less chance for confusion and ambiguity about what really happened in these encounters.

When law enforcement respond to a violent crime (home invasion, sexual assault, homicide, abduction, etc.) and the suspect or victim is not clearly in sight, extra lighting in the area of a police search would aid to speed the search along (similarly, when the police search for a missing child, more light would increase their chances of quickly finding them). Further, in some embodiments, a city or other municipality may manage a high level of integration of systems, and traffic signals could be used to automatically reroute traffic away from areas that have been cordoned off by law enforcement, thereby automatically adjusting traffic signals so police do not need to direct traffic by hand. This would reduce law enforcement roadside injuries and fatalities.

Figure 3:
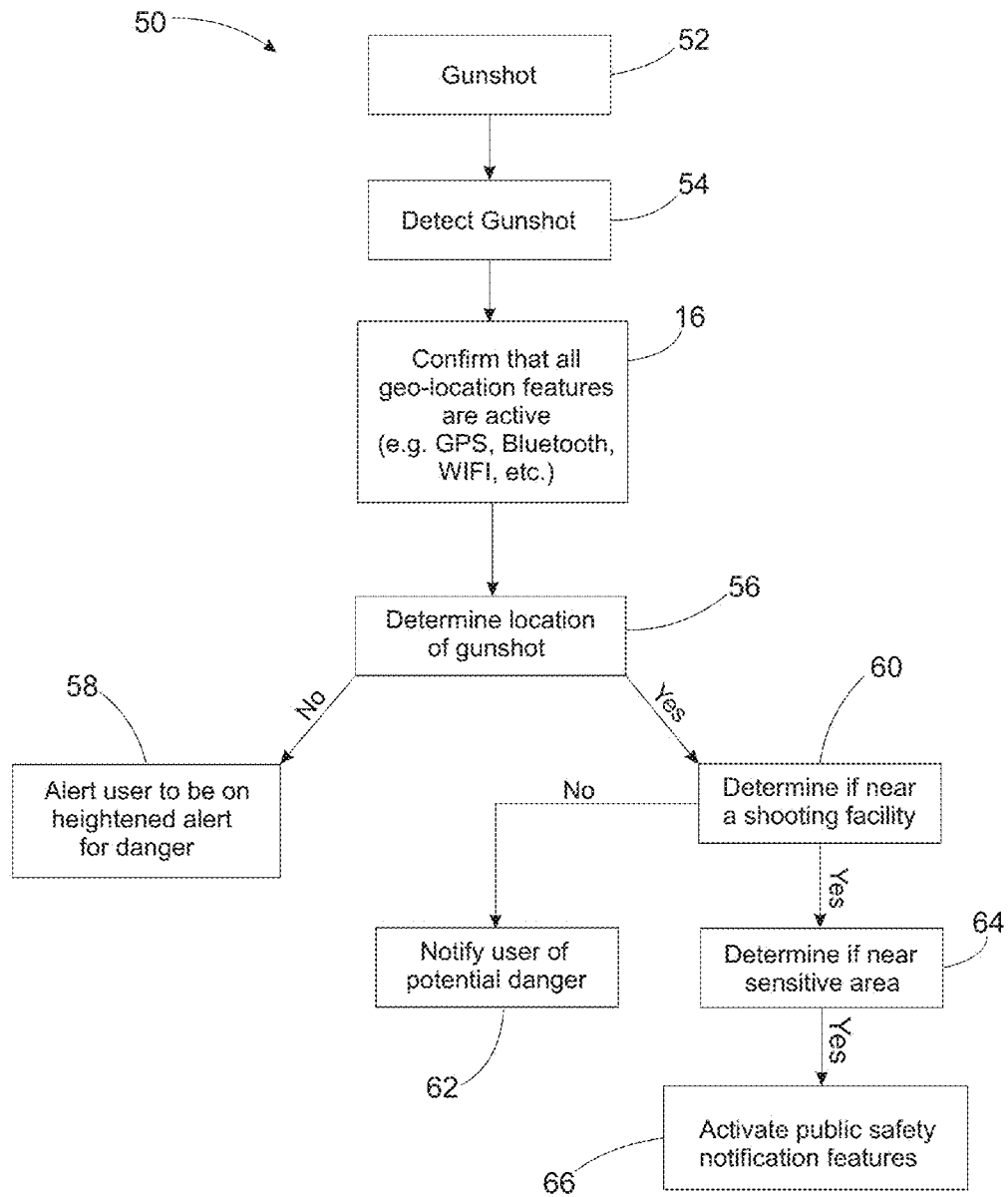
FIG. 3 is a flow chart of a method of using a danger detection system equipped home automation system, in accordance with embodiments.

Referring again to the drawings, FIG. 3 depicts embodiments that may be useful in home automation and security products. Motion sensors and cameras in a home may also alert to sounds and can initiate actions, such as, but not limited to turn on lights, text or e-mail a home owner, etc. based upon stored set criteria. The devices and sensors of a home automation system may include a danger detection system to allow these sensors the ability to recognize the sound of a gunshot and take pre-programmed actions unique to that sound (e.g., call 911, send user an emergency text, etc.).

FIG. 3 depicts a flow chart of a method 50 of using a home automation system equipped with a danger detection system, in accordance with embodiments. The method 50 begins with a gunshot (Step 52). The method 50 includes the system automatically detecting a gunshot (Step 54); and automatically determining a location of the gunshot (Step 56). Step 56 of determining a location of the gunshot may further include automatically determining if the gunshot and the danger detection system are within a preset distance of each other.

If the gunshot is not within the predetermined distance, the method 50 includes the system alerting the user to be on heightened alert for possible danger (Step 58). If the gunshot is within the predetermined distance, the method 50 includes determining if the home automation system is near a shooting facility (Step 60). If the danger detection system is not near an authorized shooting facility, the method 60 continues with Step 62 of notifying the user of potential danger. If the home automation system is near a shooting facility, then the method 50 determines if the gunshot location is near a sensitive area (Step 64). If the gunshot location is near a sensitive area, the method 50 includes activating public safety notification features (Step 66), such as, but not limited to call 911, send user an emergency text, and the like. Many technology companies are expanding into home automation (which now may include home security), and many of these systems have microphones for a number of reasons. These technologies may be used to integrate with a danger detection system according to various embodiments.

Figure 4:
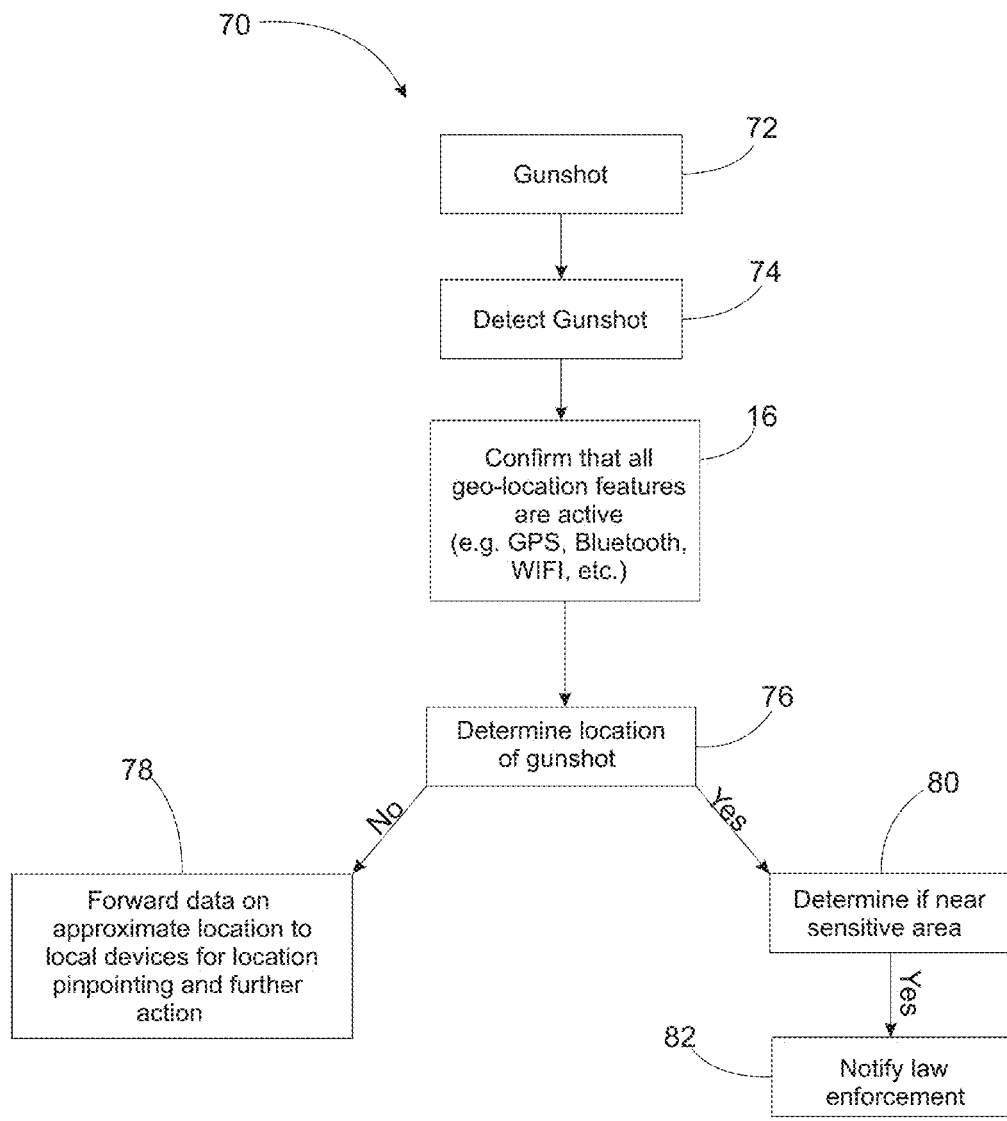
FIG. 4 is a flow chart of a method of using a danger detection system in a government setting, in accordance with embodiments.

FIG. 4 depicts a flow chart of a method 70 of using a danger detection system in a municipal/government implementation, in accordance with embodiments. The method 70 begins with a gunshot (Step 72). The method 70 includes the system automatically detecting a gunshot (Step 74); and automatically determining a location of the gunshot (Step 76). Step 76 of determining a location of the gunshot may further include automatically calculating a distance between the location of the gunshot and mobile devices operating the danger detection system. The method 70 may then include automatically determining if the gunshot location is within a preset distance of the mobile device, such as, but not limited to 200 m. If the gunshot is not within the predetermined distance, the method 70 includes the system forwarding data on approximate location of the gunshot to local devices for location pinpointing and further action (Step 78). If the gunshot is within the preset distance, the method 70 includes determining if the mobile device is near a sensitive area (Step 80). If the mobile device is near a sensitive area, the method 70 includes notifying law enforcement (Step 82).

Figure 17:
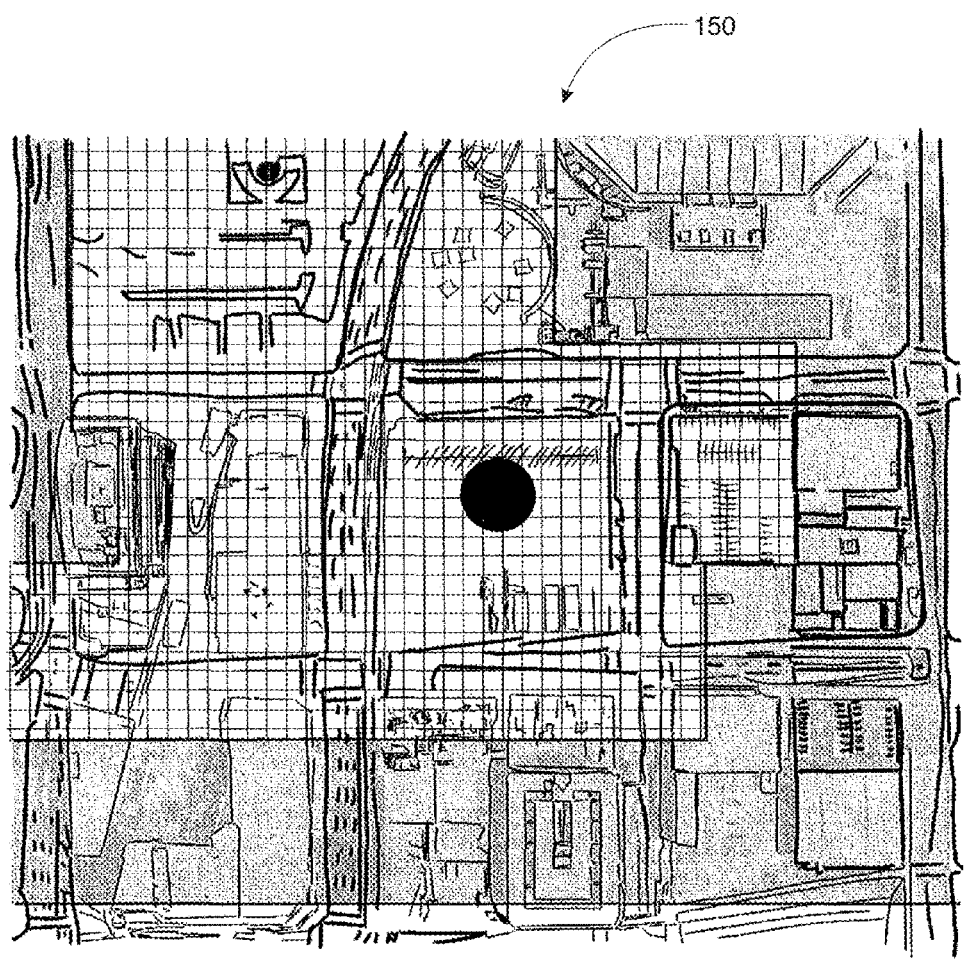
FIG. 17 is a view of a data stored in a danger directory of a danger detection system on a mobile device, in accordance with embodiments.

According to various embodiments, the danger detection system may include a geographic "danger directory." The danger directory may be a server-side database of a location (s) of reported gunshots detected by danger detection system equipped devices in an area, along with information gleaned from various other sources (traffic-condition reporting services and apps, law enforcement social media feeds and news releases, media reports, etc.), collated and integrated into a database that danger detection system-enabled mobile devices can utilize in mapping-out and displaying danger spots or areas for the device's user, such as information shown in danger directory data 150 of FIG. 17.

Figure 5:
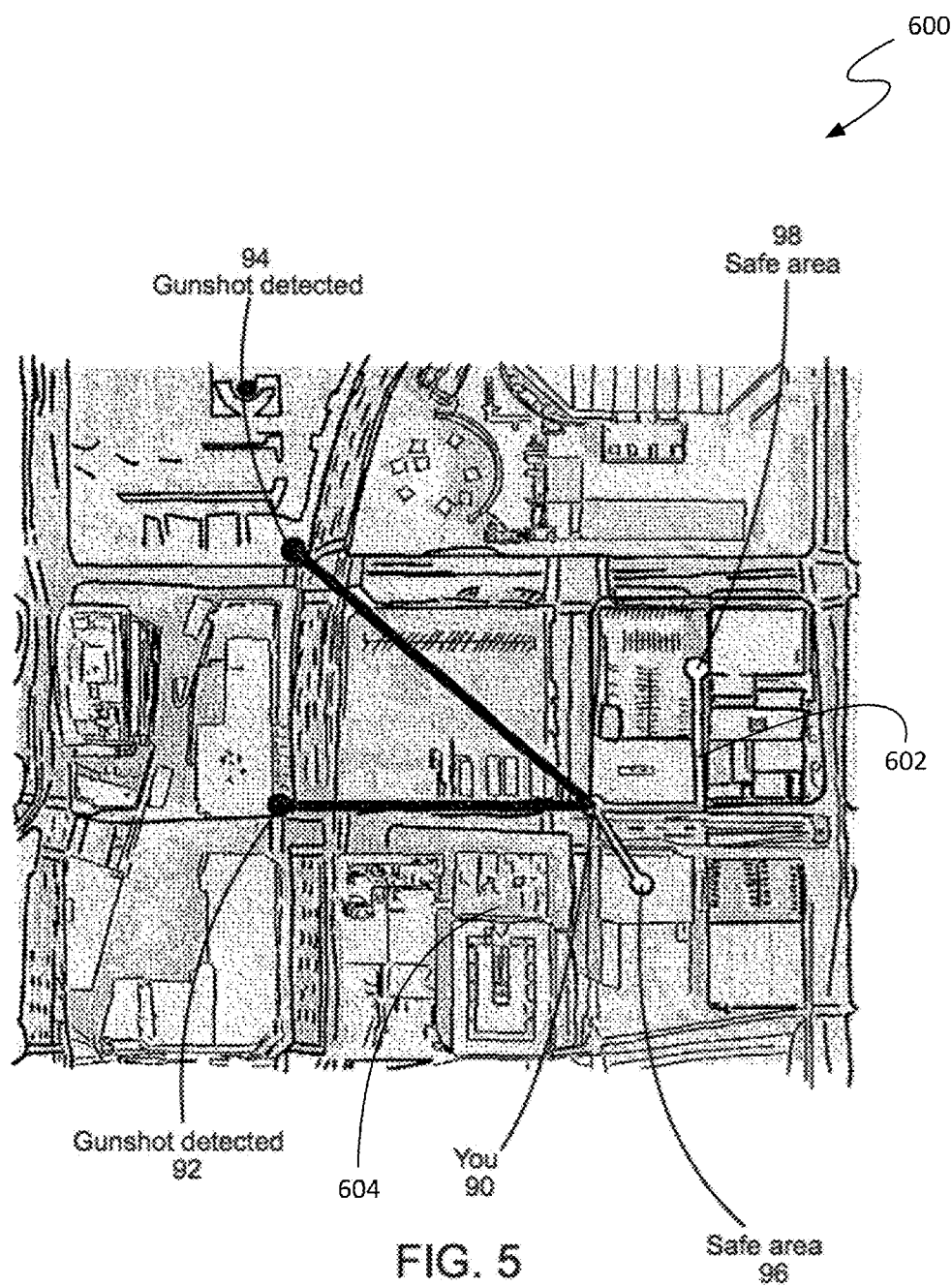
FIG. 5 is a view of a map of a danger detection system on a mobile device, in accordance with embodiments.
Figure 6:
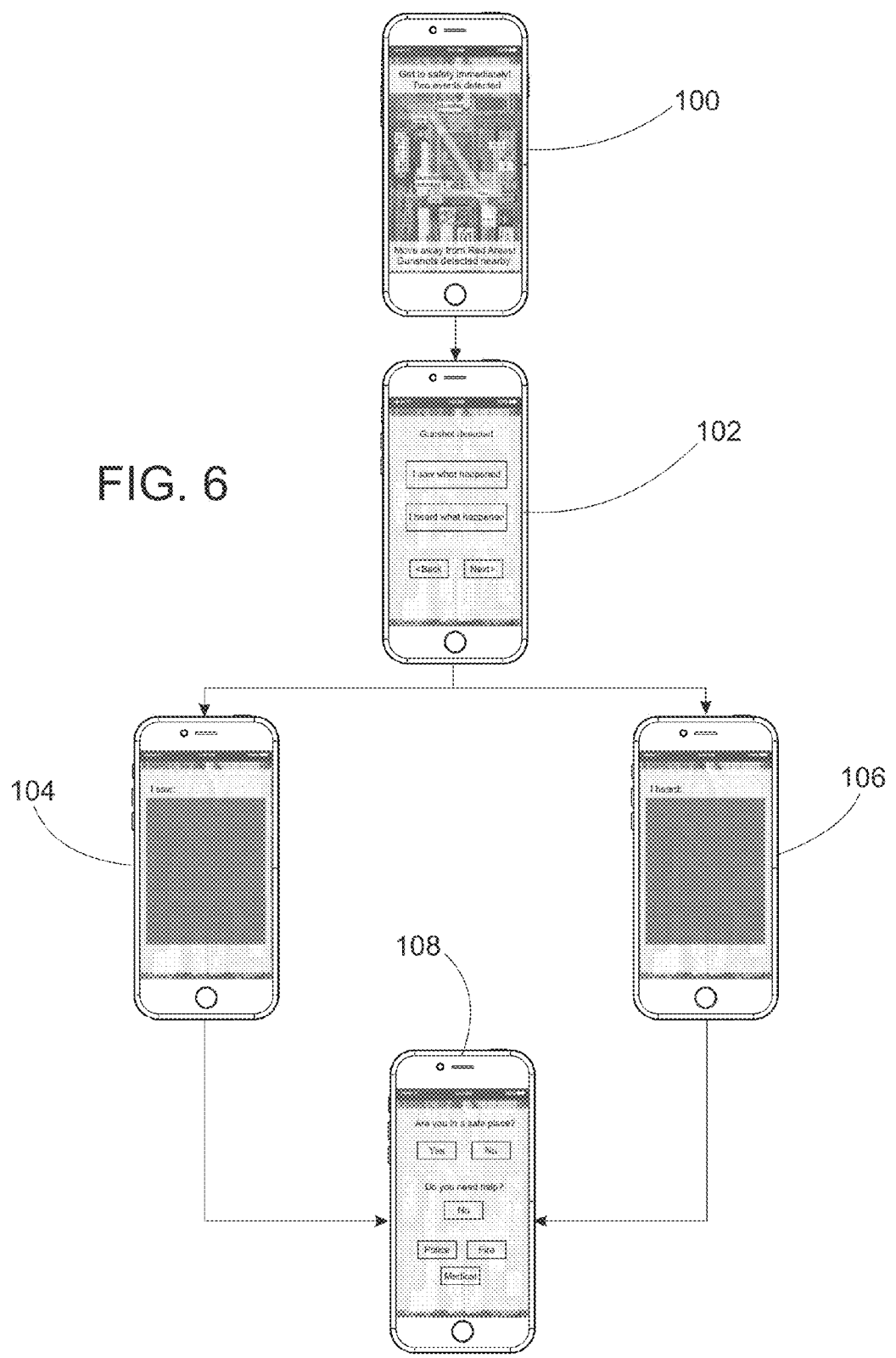
FIG. 6 is a flow chart of user interfaces of a danger detection system on a mobile device, in accordance with embodiments.
Figure 7:
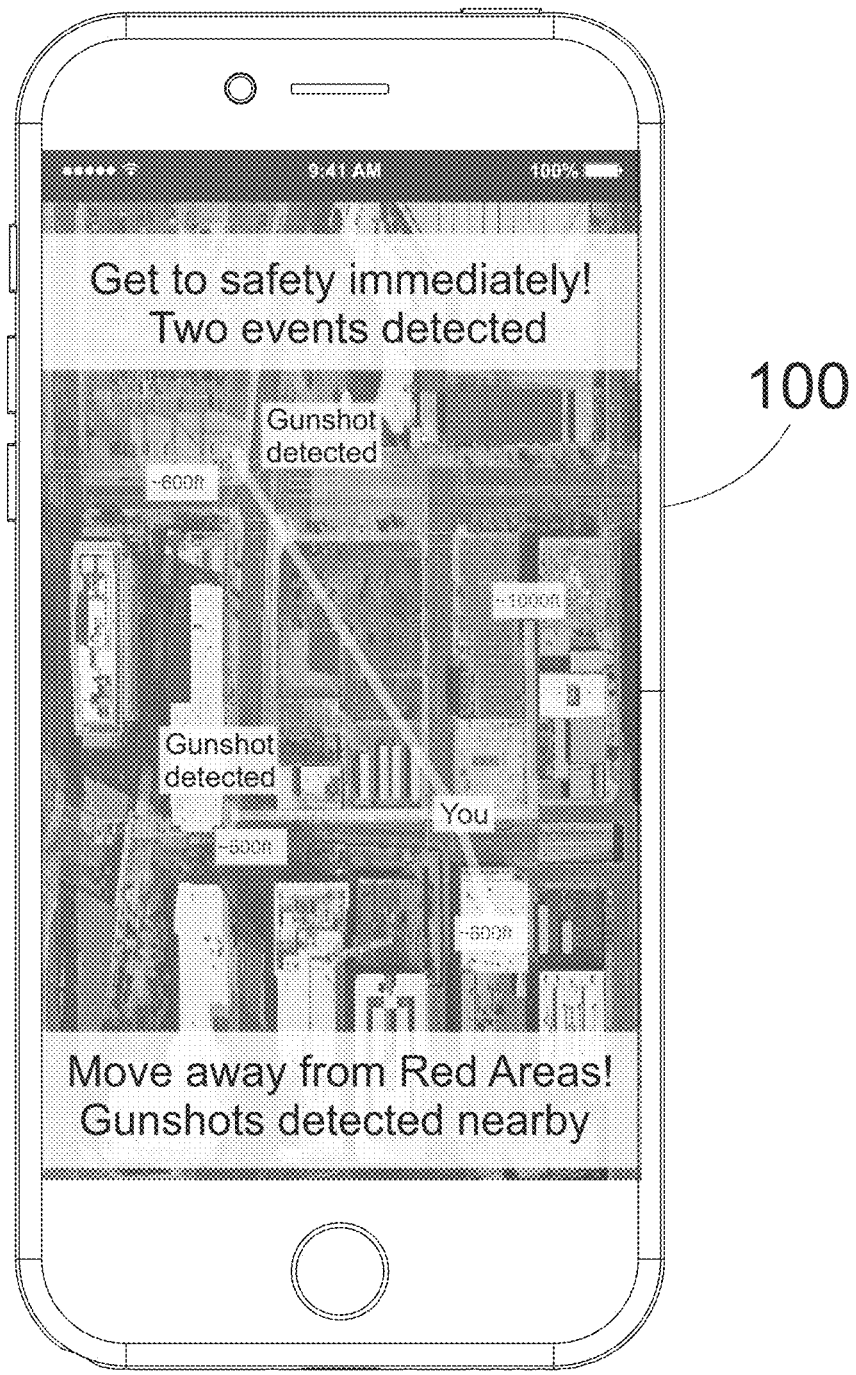
FIG. 7 is a view of a public safety notification of a danger detection system on a mobile device, in accordance with embodiments.
Figure 8:
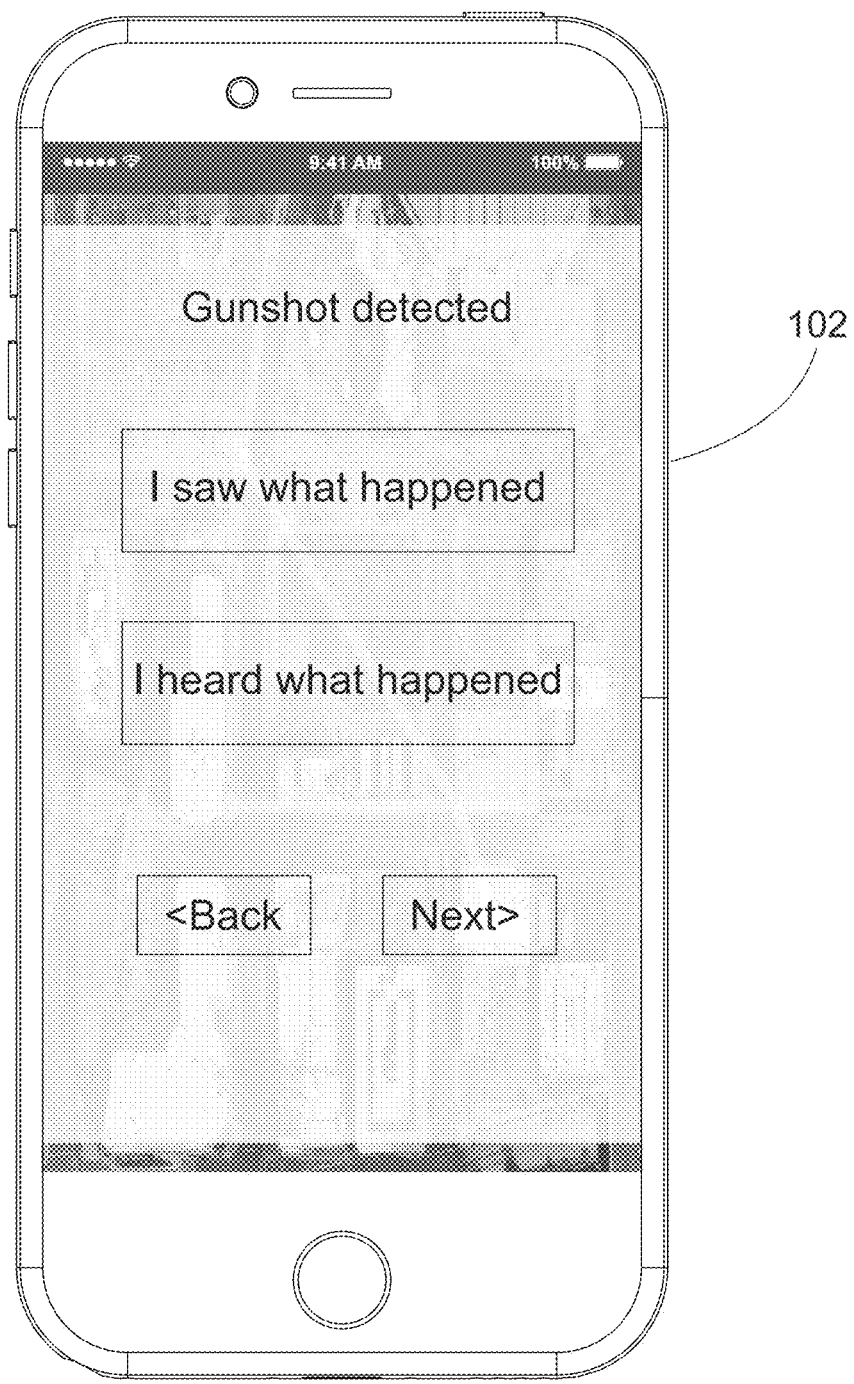
FIG. 8 is a view of a gunshot detection determination/witness reporting interface of a danger detection system on a mobile device, in accordance with embodiments.
Figure 9:
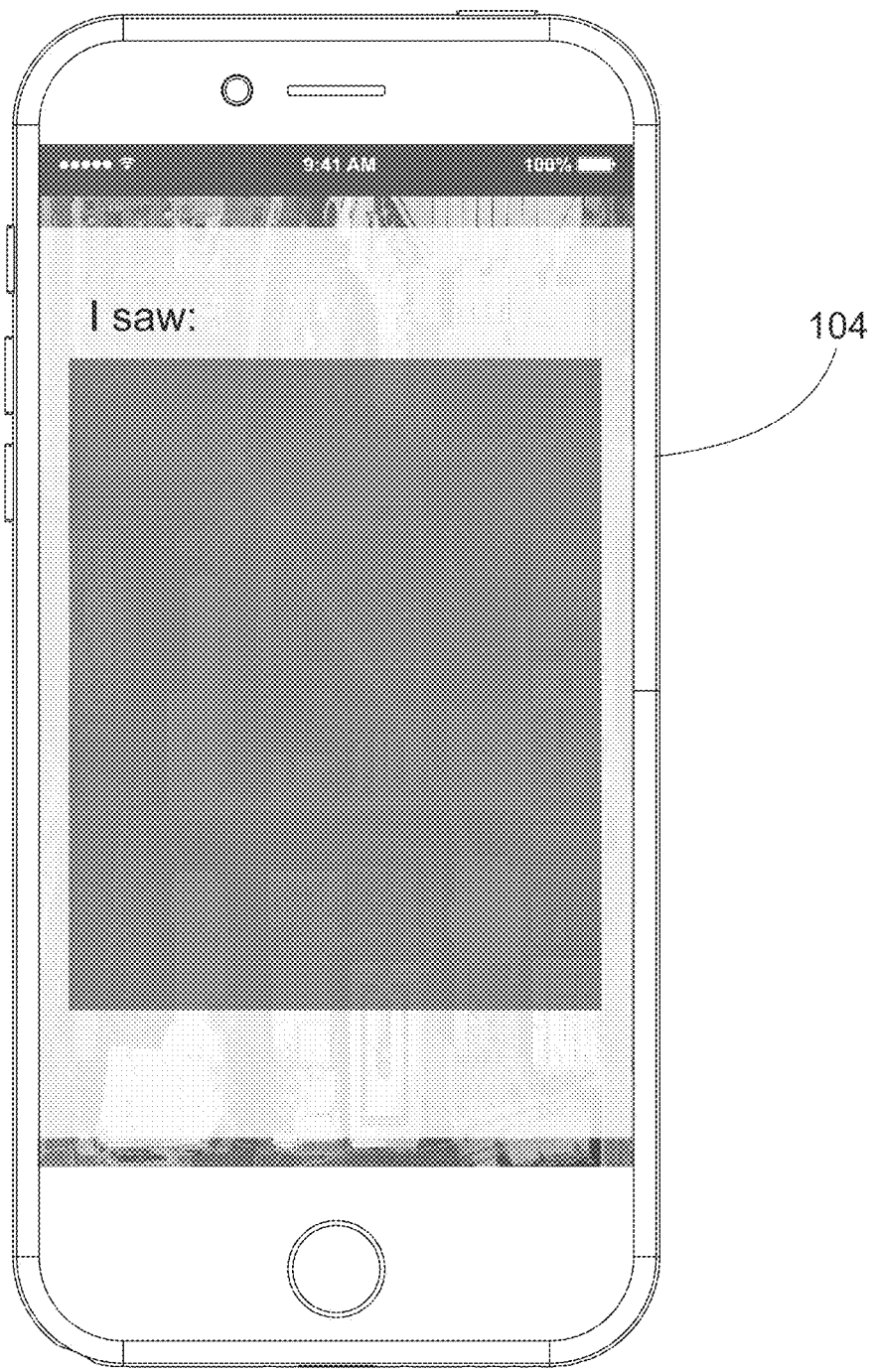
FIG. 9 is a view of a user "saw" determination/witness reporting interface of a danger detection system on a mobile device, in accordance with embodiments.
Figure 10:
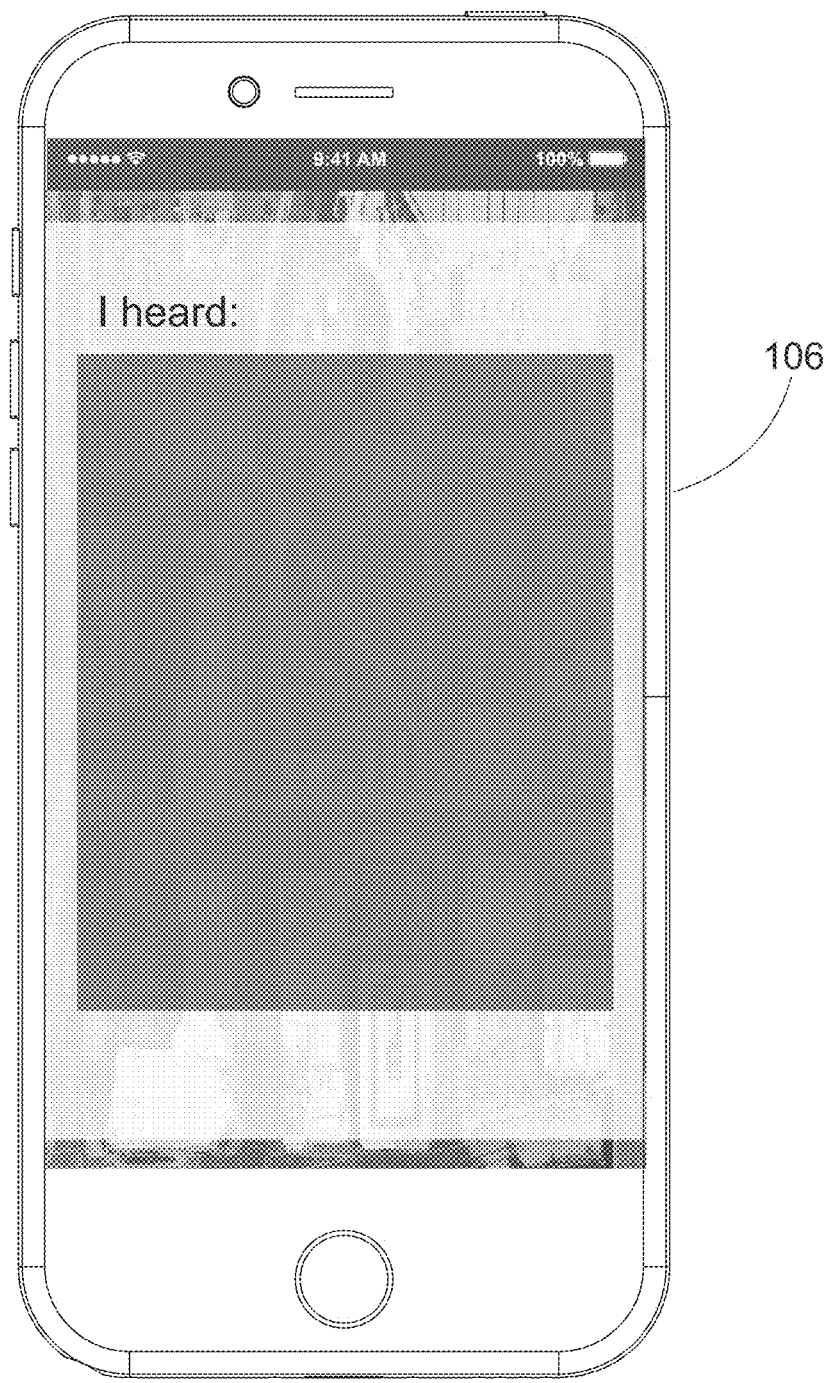
FIG. 10 is a view of a user "heard" determination/witness reporting interface of a danger detection system on a mobile device, in accordance with embodiments.
Figure 11:
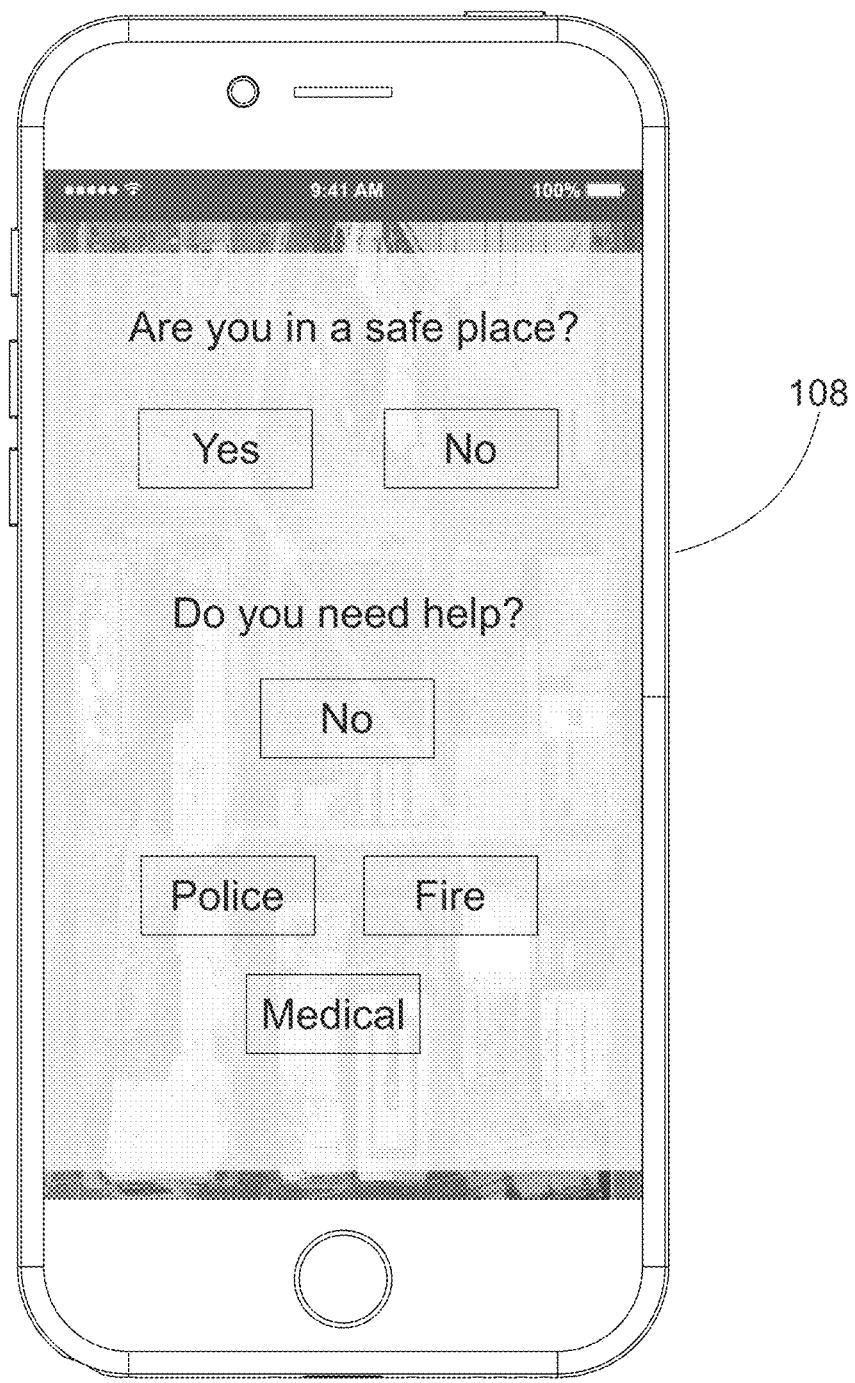
FIG. 11 is a view of a user "status" interface of a danger detection system on a mobile device, in accordance with embodiments.
Figure 12:
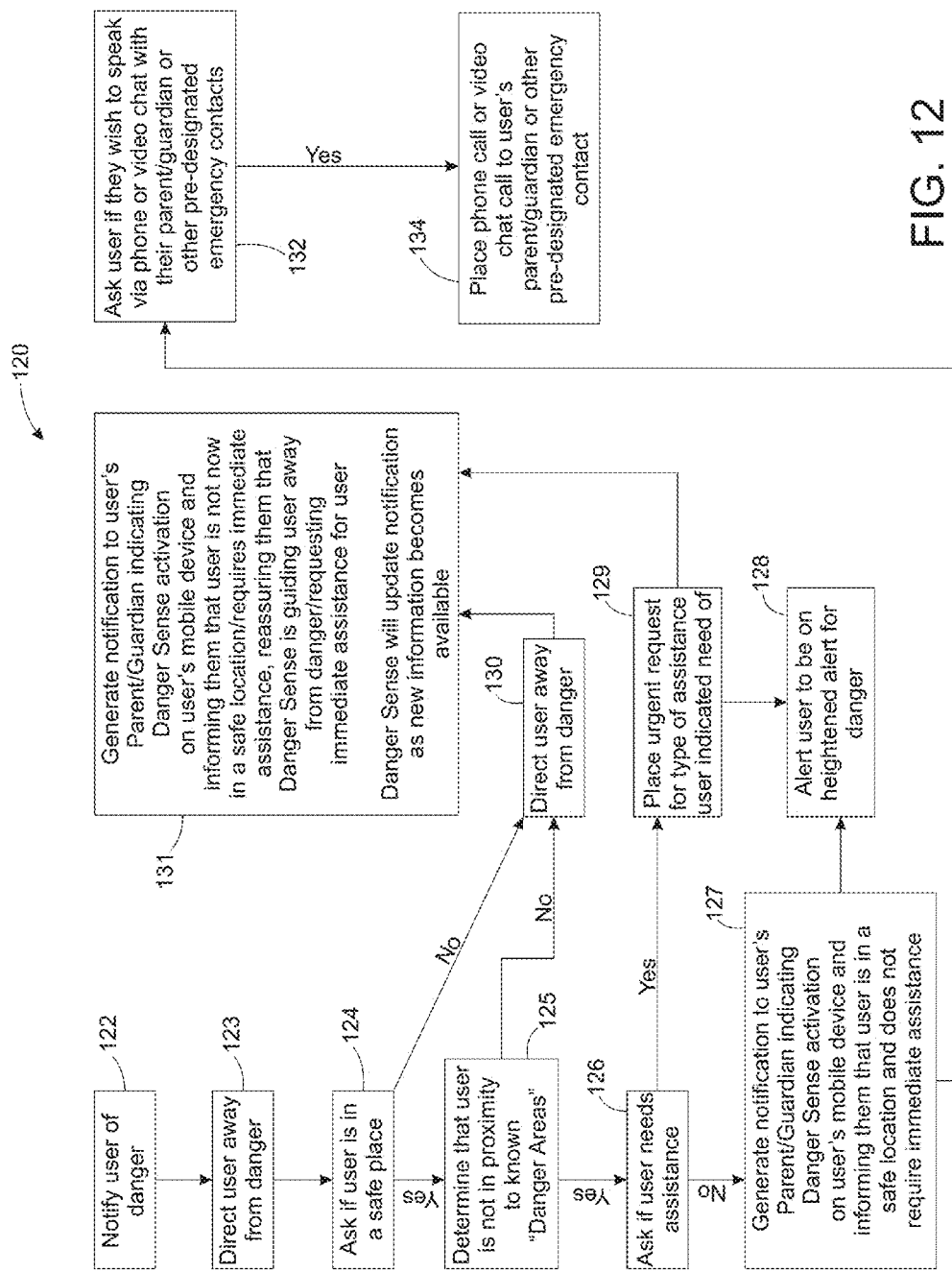
FIG. 12 is a flow chart of a method of using a danger detection system with a parent/guardian module, in accordance with embodiments.
Figure 13:
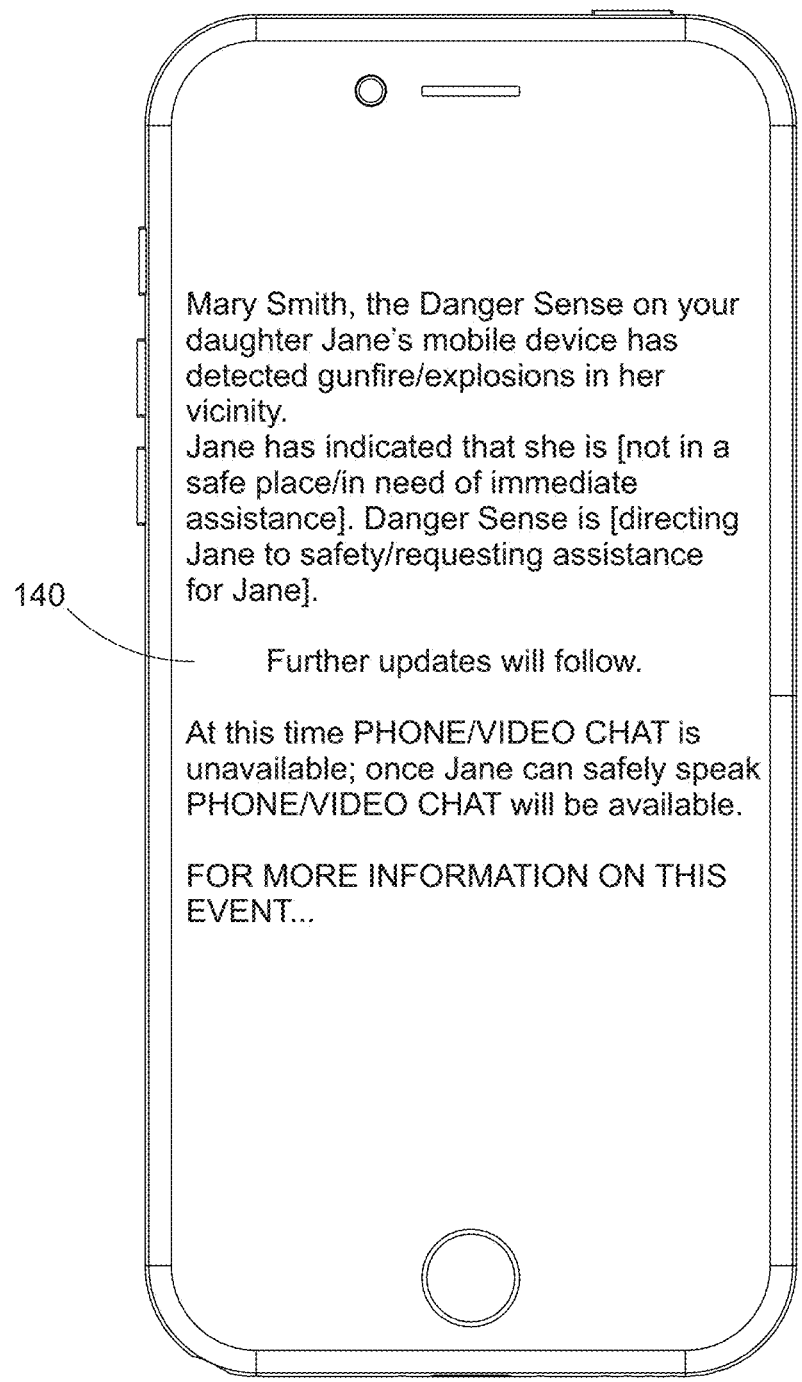
FIG. 13 is a view of a guardian notification interface of a danger detection system on a mobile device, in accordance with embodiments.
Figure 14:
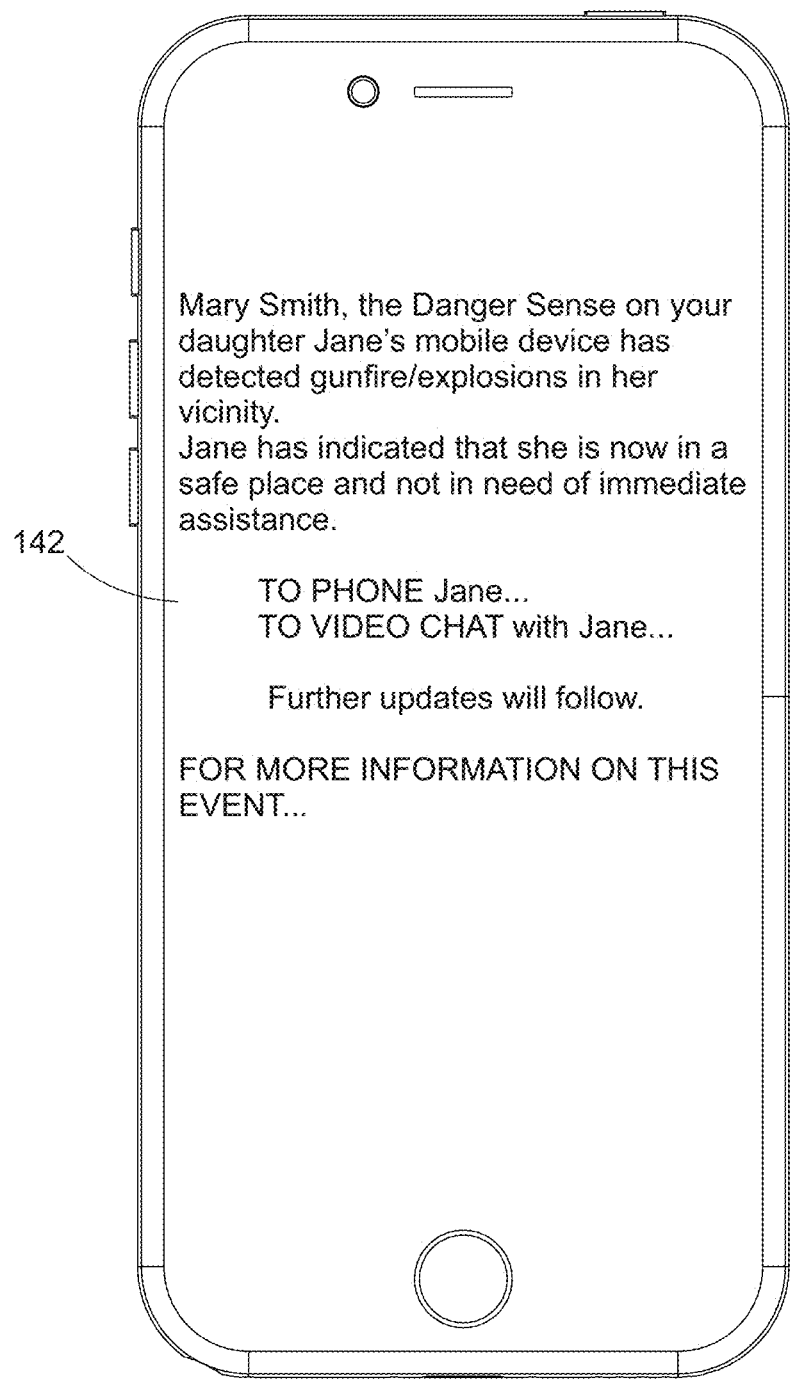
FIG. 14 is another view of a guardian notification interface of a danger detection system on a mobile device, in accordance with embodiments.
Figure 15:
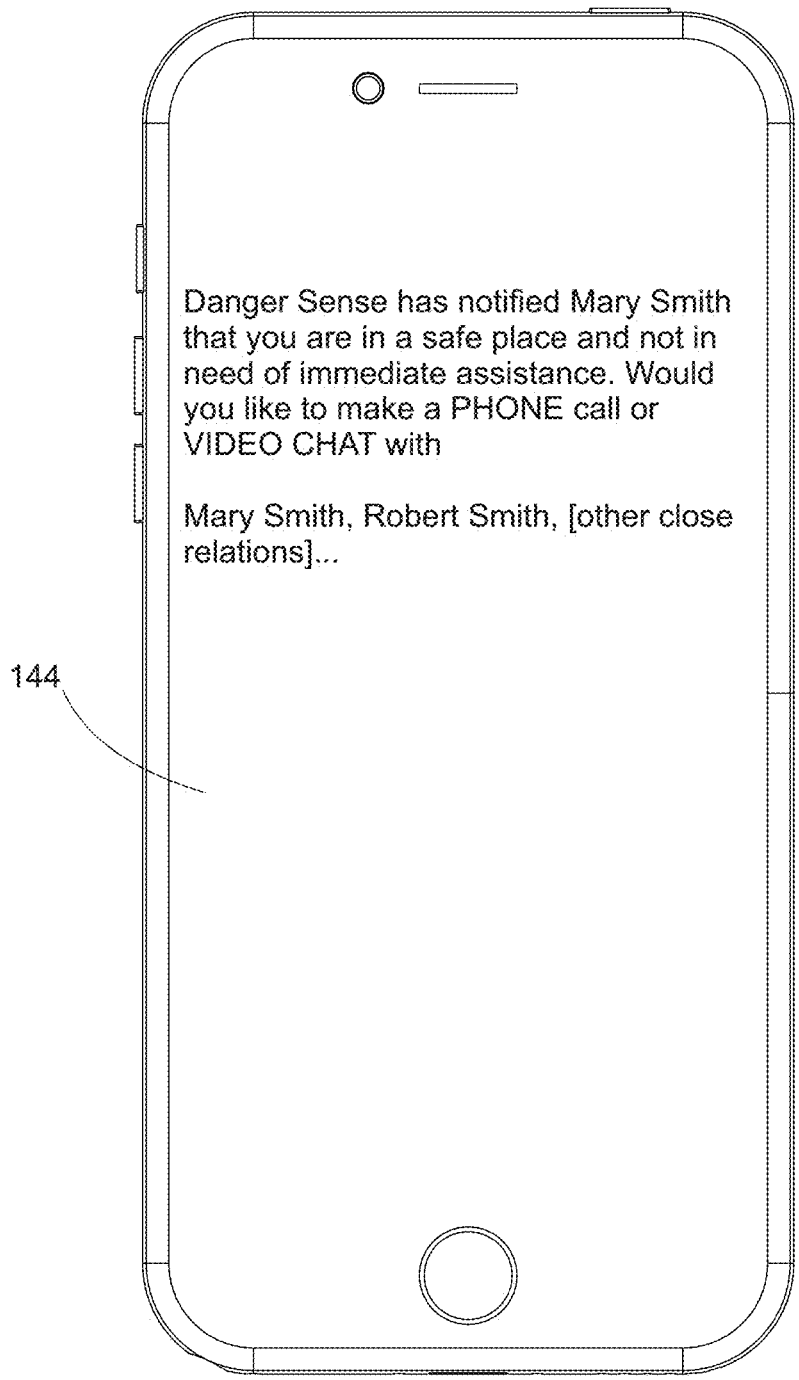
FIG. 15 is a view of a child notification interface of a danger detection system on a mobile device, in accordance with embodiments.

FIG. 5 depicts an embodiment of a notification generated by the danger detection system and displayed to a user on a mobile device. The notification may include a map that marks a user location 90, gunshots detected 92 and 94 and the relative location with regard to the user location 90. The system may display and provide a path to various shelter areas, such as, but not limited to shelter areas 96 and 98. In embodiments of the system as depicted in FIG. 5 the danger areas may be indicated in red and the shelter areas may be indicated in green. While these colors have been depicted in the drawings, it will be understood that any type of differentiation between dangerous and shelter areas may be utilized.

FIGS. 6-11 depict a flow chart of possible user interface screens according to various embodiments that may be displayed on a mobile device for notification to and interaction by the user. The system may include depicting on a display of the mobile device a public safety notification 100 that alerts the user to a gunshot danger in proximity to their location and directs the user away from the danger to shelter areas (See FIGS. 6 and 7). The system may then request information from the user in a gunshot detection "determination/witness reporting" interface 102, wherein the user may indicate information that the user may have with regard to the gunshot, such as, but not limited to whether the user saw what happened or heard what happened (See FIGS. 6 and 8). The system may then enable user input interfaces such as a user "saw" interface 104 and a user "heard" interface 106, wherein the user may input what he or she saw, heard, or otherwise observed (See FIGS. 6, 9 and 10). The system may then display a user status interface 108, wherein the user can indicate that he or she is in a sheltered or safer place, or if the user needs help (See, e.g., FIGS. 6 and 11). These user interfaces are provided solely for the exemplary purposes of this disclosure and are not considered to be a limitation as to the types and forms of user interfaces or of the types of information collected and displayed by the system. As a person of ordinary skill in the art will appreciate, other various user interfaces may be utilized.

Figure 16:
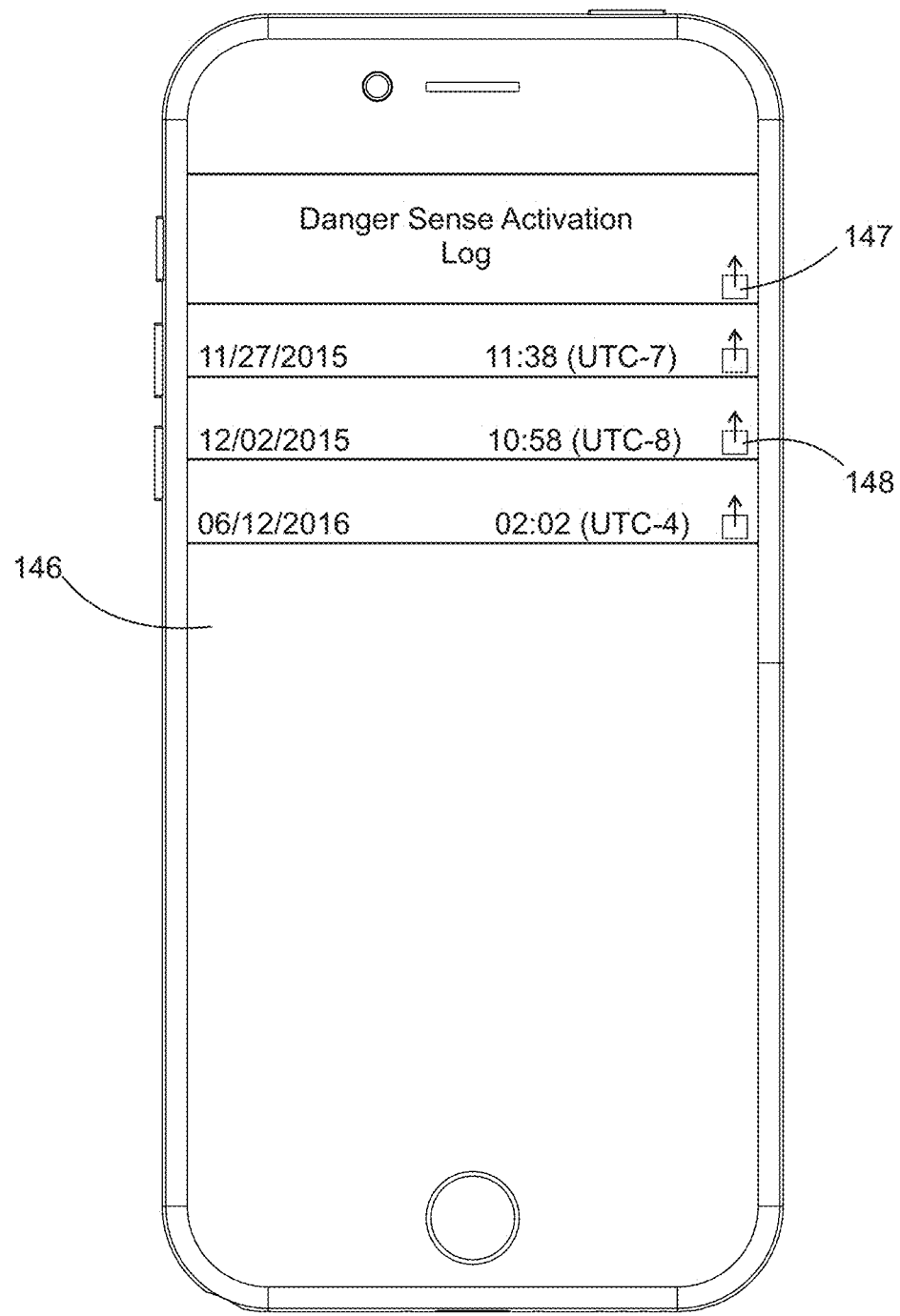
FIG. 16 is a view of a export interface of a danger detection system on a mobile device, in accordance with embodiments.

Referring further to the drawings, FIG. 16 depicts an export interface 146 of system 10 that include an option for maintaining a log of activation danger events. The logged events may then be exported using the export buttons 147 and 148, wherein export button 147 provides for export of the entire log and export button 148 provides for export of a particular event log. This may be utilized by a user for further analysis and may utilized for legal matters as evidence if necessary.

Referring to the drawing figures further, FIGS. 12-15 depict the system 10 that may include a parent/guardian interface that operates within system 10 in a method of parent/guardian notification 120. Method 120 may begin with notifying user of danger (Step 122); followed by directing user away from danger (Step 123). The method 120 includes the system through the display of the user computing device (such as a mobile device) asking if user is in a sheltered or safe place (Step 124). If the user is not in a sheltered or safe place, the system directs the user away from danger (Step 130). If the user is in a sheltered or safe place, the system determines if a user is not in proximity to known danger areas (Step 125). If the user is in proximity to known danger areas, the system directs user away from danger (Step 130). If the user is not in proximity to known danger, the system through an interface on the user computing device asks if user needs assistance (Step 126). If the user does need assistance the system places urgent request for type of assistance user indicated need of (Step 129) and alerts user to be on heightened alert for danger (Step 128). If the user does not need assistance, the system generates notification to user's parent/guardian indicating the system activation on user's computing device (mobile device) and informs the parent/guardian that the user is in a sheltered location and does not require immediate assistance (Step 127); the system asks user if he/she wishes to speak via phone or video chat with his/her parent guardian or other pre-designated emergency contacts (Step 132). If user wishes to speak, the system places a phone or video call to user's parent/guardian to other pre-designated emergency contact (Step 134).

During the entire operation of method 120, Step 131 is continuously operating to generate notification to user's parent/guardian indicating system activation of user's mobile device and informs parent/guardian whether the user is not in a sheltered location, requires immediate assistance and reassurance that the system is guiding user away from danger and requesting any immediate assistance for user, and further provides update notifications as new information becomes available. For example, when the system 10 is activated on user's mobile device and the user is in danger, a notification is automatically sent to the user's parent/guardian/emergency contact such as with guardian notification interface 140 of FIG. 13 notifying the parent/guardian/emergency contact that the user is in danger, is not in a sheltered place, or needs immediate assistance. Once the user moves along directed paths or routes to a sheltered or safer location, the system provides an update such as guardian notification interface 142 of FIG. 14 to the parent/guardian/emergency contact notifying that user is now in a sheltered place and providing parent/guardian/emergency contact an option to initiate communication with user. The system 10 also notifies the user through user notification interface 144 of FIG. 15 that user's parent/guardian has been notified of user's current status and further provides an option for user to initiate communication with parent/guardian.

While it is shown certain types and forms of communication between a user and parent/guardian or other emergency contact, it will be understood that illustrated communications and forms of notification are by way of illustration, and not by limitation. Other types of notification with various words and stylization may be utilized so long as the user's status is accurately communicated to the parent/guardian or other emergency contact.

It will be understood that while the danger detection system has been disclosed with regard to a gunshot that activated the system, other types of danger sounds may also activate system. For example and without limitation, an explosion may be the sound determined by the danger detection system that activates the processes. It should also be appreciated that the danger detection system includes program instructions that allow for the system to determine differences between actual gunfire or explosions and those that are not real, such as in a TV show or film. A database of sounds for comparison by the system to authenticate the sound as being an actual sound may be included as part of the system.

Conventional gunshot detection systems make use of a network of stationary microphones, sometimes sophisticated directional microphones, spread across the area being monitored. The location of a gunshot may be determined by comparing when the shot was heard by various stationary microphones, or by triangulation using directional information from a few more sophisticated directional microphones. A large number of stationary microphones must be deployed to obtain accurate location information, an infrastructure that can be very expensive to deploy and maintain. Unless expensive redundancy is built in, the failure of only a handful of devices can render the system "blind" in an area. The use of directional microphones can reduce the number of devices needed, but can increase the cost of installation and maintenance. Furthermore, conventional systems must be deployed to account for population centers averaged over a day. For example, one part of a city may have more activity (and more crime) during the daytime, and another part of the city may become more active at night. Because conventional systems make use of stationary microphones, both of those areas would need to be covered. Additionally, conventional systems typically only provide information to law enforcement, and do not directly assist the public in avoiding dangerous situations or active shooters.

Contemplated herein is additional embodiments of a danger monitoring system (or danger detection system) that make use of a distributed network of danger monitoring devices in communication with a danger monitoring server. Some of the danger monitoring devices may be phones or other mobile computing devices owned by private citizens. Advantageous over conventional systems, the use of mobile danger monitoring devices (sometimes in addition to stationary monitoring devices), particularly devices associated with individuals, significantly reduces the cost of installation and maintenance of the monitoring system. Utilizing the mobile devices of private citizens also ensures the density of monitoring devices is high in highly populated areas, independent of time of day. As the density of people changes throughout a day, the monitoring network changes as well. Additionally, in exchange for allowing the background use of their mobile device for danger detection, private citizens are provided with alerts regarding dangerous events, and may even be instructed how to escape the detected danger. In exchange for a slight drain on a battery, people can be part of a network that is constantly looking for danger, ready to guide them to safer or sheltered locations. This is advantageous over the more expensive, less flexible conventional systems that only provide information to law enforcement agencies.

It should be recognized by those skilled in the art that the embodiments discussed below may be modified using aspects of embodiments of a danger detection (or monitoring) system described above.

Figure 18:
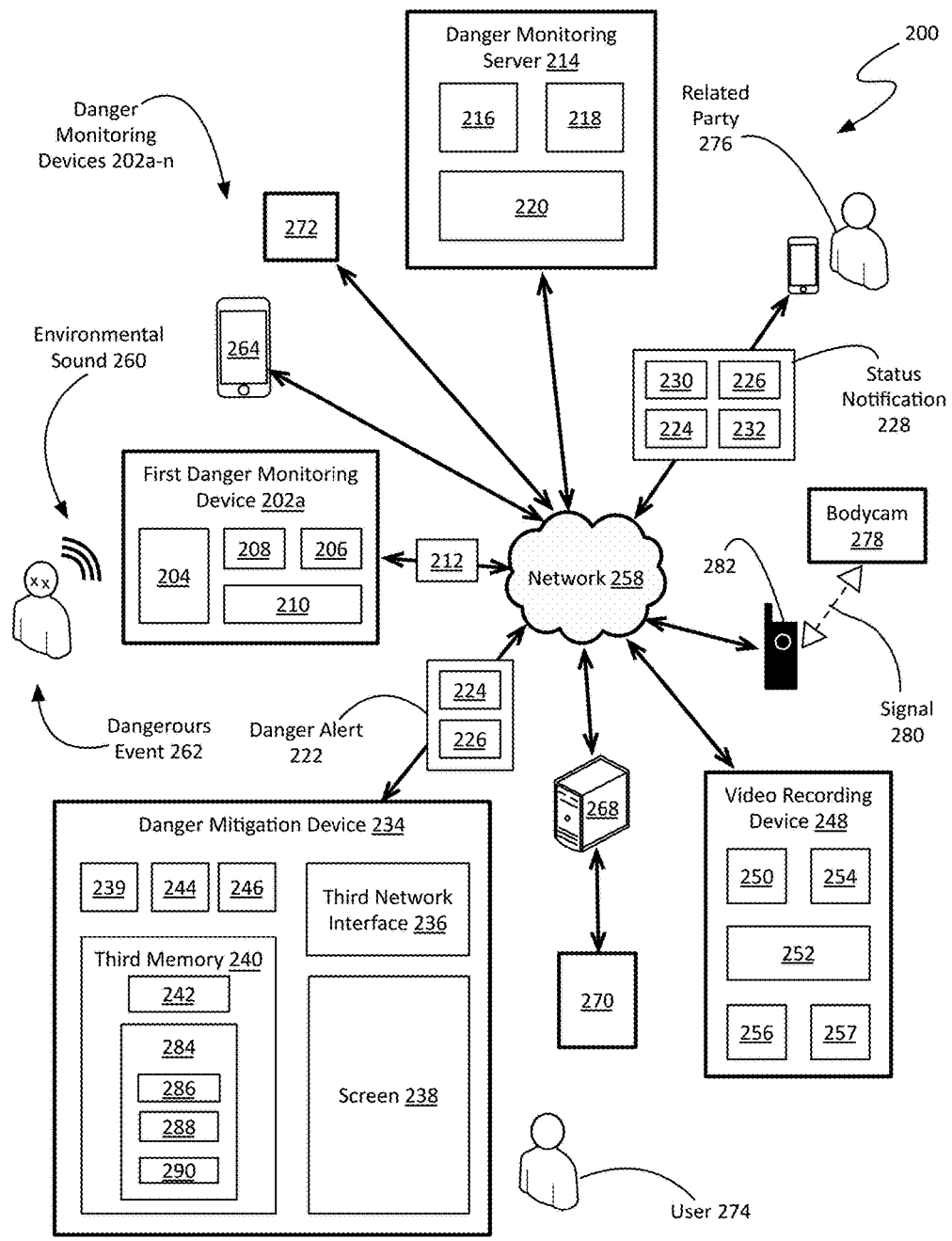
FIG. 18 is a network view of a danger monitoring system.

FIG. 18 is a network view of a non-limiting example of a danger monitoring system 200 designed to detect and locate potentially dangerous events 262, and thereafter take appropriate action, such as warn the public and guide them to safety, or activate recording devices. As shown, the danger monitoring system 200 comprises a first danger monitoring device 202a (part of a plurality of danger monitoring devices 202), a danger monitoring server 214, and a danger mitigation device 234, all communicatively coupled to each other through a network 258.

The first danger monitoring device 202a is a device configured to sense environmental changes indicative of a dangerous event 262 (e.g. the sound of a gunshot, etc.) and to communicate information to a danger monitoring server 214 for further processing. As shown, the first danger monitoring device 202a comprises a microphone 204, a first memory 206, a first processor 208, and a first network interface 210 through which it is communicatively coupled to a network 258. A danger monitoring device 202 may be a mobile phone 264 in some embodiments. In some embodiments, the microphone 204 may be a directional microphone (i.e. a microphone able to identify the direction of propagation of an incoming sound wave), while in others the microphone 204 may be a conventional or general-purpose microphone (e.g. the microphone built into a mobile device, etc.). In some embodiments, a danger monitoring device 202 may make use of more than one microphone 204. For example, multiple conventional microphones 204 may be used together to determine, or estimate, a direction of propagation of an incoming sound wave relative to the orientation of the multiple microphones 204. As a specific example, some smartphones have multiple microphones to assist in noise cancellation during conversations; in an embodiment, these microphones may be used to estimate a relative direction of a digitized noise. Such a determination may be made at the time of detection, or after it has been determined that a digitized sound meets a threshold criteria for a dangerous event (to reduce unnecessary processor load of determining the direction of innocuous sounds.)

In some embodiments, a danger monitoring device 202 may comprise additional, or different, sensors that can sense environmental changes indicative of a dangerous event 262, other than microphones 204. Examples include, but are not limited to, radiation detectors, gas detectors (e.g. caustic gas, flammable gas, etc.), accelerometers, and the like. Some embodiments may make use of the data provided by commonly used fitness trackers and wearable devices; such data is commonly provided to a proximate smartphone, if the tracker or wearable is not networked by itself. An individual's vital signs may be considered part of the environment that changes in response to a dangerous event, especially when similar changes are experienced by multiple individuals at the same location. For example, if the heart rates of 3 people in a convenience store suddenly jump to a range associated with fear or panic, at roughly the same time, a dangerous event 262 may be occurring in the store, or about to occur. As used herein, roughly the same time includes within 0-20 seconds, 0-10 seconds, 0-5 seconds, 0-2, or less than one second, or substantially or thereabout, i.e. within 20% difference. As shall be discussed below, the danger monitoring server 214 may make use of different types of information to provide context to the data reported by danger monitoring devices 202. For example, location data and a business index may allow a server 214 provided with multiple spiking heart rates to differentiate between a bank heist and a jump scare in the latest horror movie. As another example, accelerometer data from a mobile device or wearable may be used to differentiate vital sign data from a wearable (e.g. pulse rate, etc.) resulting from a fall or impact and faulty data due to poor sensor contact.

Some danger monitoring devices 202 may further comprise some form of location determining technology (e.g. GPS receiver, Wi-Fi interface with correlation maps, etc.). Other danger monitoring devices 202, such as a stationary sound monitoring device 272, whose location is fixed, may simply have an identifier which may be correlated with a known location stored by the server 214.

In some embodiments, the first danger monitoring device 202a is capable of capturing or digitizing an interval of environmental sound 260 using the microphone 204, determine whether the digitized interval meets the criteria for a dangerous event 262, and sends the observations and other information to the danger monitoring server 214 as a first danger observation data 212. The first danger monitoring device 202a will be discussed in greater detail with respect to FIG. 19. The first danger observation data 212 will be discussed in greater detail with respect to FIG. 21.

As shown, the first danger monitoring device 202a may transmit a first danger observation data 212 to the danger monitoring server 214 through the network 258. According to various embodiments, the danger monitoring server 214 is a computing device configured to correlate the observation data obtained and sent by a plurality of monitoring devices 202, verify whether to not a dangerous event 262 has occurred or is occurring, determine or clarify the location of the event 262, and take appropriate action. As shown, the danger monitoring server 214 comprises a second memory 216, a second processor 218, and a second network interface 220 through which it is communicatively coupled to monitoring devices 202 and other devices via a network 258. It should be noted that the second memory 216, as well as the first memory 206 of the monitoring device 202a and the third memory 240 of the danger mitigation device 234, may refer to volatile memory, nonvolatile memory, or a combination of both, according to various embodiments. The second memory 216 of the server 214 may also comprise a database, which may be integral to the hardware of the server 214 or be communicatively coupled to the server 214. In some embodiments, the server 214 may be a single computing device, while in others, the server 214 may comprise multiple computing device working in concert, as is known in the art.

As previously mentioned, the danger monitoring server 214, using the second memory 216 and second processor 218, verify and locate the dangerous events 262 reported by danger monitoring devices 202. The structure and function of the second memory 216 and second processor 218 of the monitoring server 214 will be discussed in greater detail with respect to FIG. 20. Upon verifying and locating a dangerous event 262, the danger monitoring server 214 takes one or more appropriate actions, in accordance with various embodiments.

According to various embodiments, the danger monitoring server 214 will notify different entities once a dangerous event 262 has been verified and located. As shown, the second network interface 220 may transmit a danger alert 222 comprising the determined event location 224 and an event timestamp 226. In some embodiments, the event location 224 may be a street address, and in others it may be a latitude and longitude, or any other geographic representation known in the art.

According to various embodiments, the event timestamp 226 may be extrapolated, at least in part, from timing data received from one or more monitoring devices 202 in conjunction with the dangerous event 262. In some embodiments, the event timestamp 226 may be an average of observation data timestamps, while in others the event timestamp 226 may be calculated using the determined event location 224, the location associated with an observation data 212 and a timestamp associated with the observation data 212. Having an accurate event timestamp 226, especially early on in an ongoing dangerous event 262, may be advantageous, as it may be used to determine clock discrepancies among monitoring devices 202 proximate to the event 262.

As a specific example, a gun is fired and heard by four monitoring devices 202, one of which has an inaccurate internal clock. The server 214 determines the location 224 and an accurate timestamp 226 for the first shot using the data from the three devices 202 with clocks that are approximately synchronized; the data from the fourth device 202 may be ignored if the timestamp is too different from the others, or if the time differential does not match with an observed sound intensity. However, once the location 224 and timestamp 226 has been determined for the first shot, data from subsequent shots may be validated using the difference between the fourth devices reported timestamp and the accurate timestamp 226. By thus determining a correction factor, the inaccuracy of the fourth monitoring device may be compensated for, and thus remain a valid data source in an ongoing dangerous event 262, at little computational cost. According to various embodiments, a system 200 may make use of monitoring devices 202 implemented in a variety of hardware (e.g. different models and brands of smartphones, etc.) which may have clock or other discrepancies. Accurate determination of location 224 and timestamp 226 by the server 214 may be used to compensate for such discrepancies, increasing overall accuracy and responsiveness.

As shown, the danger monitoring server 214 may send a danger alert 222 to a danger mitigation device 234 (discussed below). According to various embodiments, the danger alert 222 may also be sent to other entities and their representative devices, such as law enforcement, fire department, emergency medical services, and the like. In some embodiments, a single danger alert 222 may be sent for a dangerous event 262, while in other embodiments, multiple danger alerts 222 may be sent for a single dangerous event 262, providing updated information as further verification and analysis is performed by the server 214. It should be noted that a dangerous event 262 may refer to a single discernable event, such as a gunshot or explosion, and that an ongoing emergency or crisis may comprise multiple dangerous events 262. Thus, in some embodiments, various parties may receive updates with additional or corrected information for events 262 that occurred in the past, or may be used to improve analysis of events 262 yet to occur. For example, further analyses may reveal that the first shot of an active shooter scenario occurred on a third floor, rather than the second, potentially changing how subsequent shots are analyzed/located, or how evacuation or tactical strategies are formed.

In some embodiments, the danger monitoring server 214 may send a status notification 228 using the second network interface 220. As previously discussed with respect to FIGS. 12 through 15, the system 200 may be configured to notify pre-specified third parties 276 a user 274 may with to be informed and updated upon occurrence of a dangerous event 262. According to various embodiments, a status notification 228 may comprise a summary 230 of the dangerous event, the event timestamp 226, the event location 224, and a current status 232 of the user 274. In some embodiments, the current status 232 of the user may be automatically determined based upon data provided by a device associated with the user, such as a monitoring device 202 or a danger mitigation device 234. For example, a third party 276 may be informed that the user 274 is currently moving toward cover, or is hiding in a secure location, based on, e.g., accelerometer or GPS data from a mobile phone. In some embodiments, the user 274 may be prompted to provide their status. See, for example, FIG. 11. In some embodiments, a user 274 may only be prompted for information if a device, local or remote to the user 274, determines they are not in immediate danger (to avoid distracting a user 274 from seeking immediate shelter from danger). The danger monitoring server 214 may send multiple status notifications 228, with updates or corrections, according to various embodiments.

In some embodiments, the danger monitoring server 214 may communicate with additional or different devices upon verification and location of a dangerous event 262. For example, the server 214 may communicate with a civil infrastructure gateway device 268 through the network 258. In the context of the present description and the claims that follow, a civil infrastructure gateway device 258 may be any networked device that is further communicatively coupled, through the network 258 or otherwise (e.g. direct communication, closed network, etc.), to some aspect of infrastructure 270 that is not directly managed by a law enforcement agency. Examples include, but are not limited to, public lighting, street lights, traffic signals and electronic signs, light rails and other mass transit systems, alarm systems (e.g.

schools, businesses, etc.), navigation services, camera systems, and the like. Coupling the danger monitoring server 214 with one or more such gateway devices 268, and making said devices 268 responsive to signals from the server, may allow preventative and mitigating action to be taken in response to a dangerous event 262 before human intervention would be able to arrive to address the event directly.

It should be noted that, in some embodiments, making the gateway devices 268 responsive to signals from the server 214 means that the gateway devices 268 are configured to receive event information, such as a danger alert 222, and are configured to take certain actions based upon the information. In other embodiments, making the gateway device 268 responsive to signals form the server 214 means that the server 214 is able to directly command one or more pieces of infrastructure 270, such as those enumerated above, through the gateway device 268. In other words, in some embodiments, the gateway device 268 decides what to do in response to an event, and in others, the gateway device 268 simply takes orders and passes them on to the appropriate piece of infrastructure 270.

The examples of infrastructure 270 listed above, as well as others unmentioned, may be used to protect the public from harm associated with a detected dangerous event 262. For example, the street lights may be brightened at night in the blocks surrounding a detected gunshot, to assist law enforcement when they arrive. In another example, traffic lights and electronic signs may be used to direct traffic and pedestrians away from the area near a detected dangerous event 262. In still another example, determination that a dangerous event 262 has occurred within a predefined distance of a school may automatically trigger a lockdown alarm in the school (or business, government building, event space, etc.). Another example may be the use of a navigation service provider or traffic information provider to redirect traffic away from the danger. As a specific example, a navigation app like Waze or Apple Maps could reroute drivers away from danger, in response to the Waze or Apple servers (or traffic data provider, or other party) receiving a signal from the danger monitoring server 214. Still another example is that security cameras, public or private, may be activated, or elevated to high resolution storage, in the area proximate to a detected event 262.

According to various embodiments, a danger monitoring server 214 may send a danger alert 222 to a danger mitigation device 234 after verifying and locating a dangerous event 262. A danger mitigation device 234 is a device that is configured to reduce or mitigate the risk faced by a user 274 in the proximity of a dangerous event 262. In many embodiments, this risk is reduced or mitigated by providing the user 274 of the danger mitigation device 234 with instructions, directions, or some sort of action plan to escape, avoid, or minimize the risk of harm posed by that specific dangerous event 262.

As shown, a danger mitigation device 234 comprises a third processor 244, a third memory 240, and a third network interface 236 through which the mitigation device 234 may receive information such as danger alerts 222 and other data (e.g. map data 242, situation specific instructions, updates from law enforcement or other agencies, etc.). In some embodiments, a danger mitigation device 234 may further comprise a screen 238, while in others a mitigation device 234 may be screen-less, and communicate with a user 274 through one or more of audio, tactile, or other desirable feedback.

In some embodiments, including the non-limiting example shown in FIG. 18, a danger mitigation device 234 may further comprise a GPS receiver 239 communicatively coupled to the third processor 244. The GPS receiver 239 is used to determine the current location of the mitigation device 234, so specific instructions, directions, or other information may be provided to the user 274 framed in context of their surroundings. For example, the screen 238 may display a map indicating the mitigation device's present location as well as the determined location of a dangerous event 262. In some embodiments, a danger mitigation device 234 may rely on another device for determining the present location. For example, in an embodiment, a smart watch or other wearable device may function as a danger mitigation device 234, receiving information from a danger monitoring server 214 through a paired smartphone 264 that has determined the current location and is in communication with the server 214.

Some embodiments of a danger monitoring system 200 may employ mitigation devices 234 that have some other form of location-determining technology. As a specific example, in a school setting, each faculty member may be issued a device, such as a tablet, for use in a variety of educational settings. The school campus may be provisioned with an array of low energy beacons (e.g. Wi-Fi, BTLE, etc.) which allow the tablets to determine their location within a building. Such a configuration may be advantageous in a school or commercial setting where equipment is being provided, maintained, and operated by one entity (e.g. school, business, etc.) in a localized, typically indoor environment. Low end GPS technology can have difficulty determining accurate locations within buildings, which may be problematic in situations where the difference of a few feet may change what room the system thinks the user is in. The use of non-GPS technology in such settings may provide sufficient precision in locating the devices without the expense of more sophisticated GPS receivers (e.g. large number of channels, sophisticated antennae, etc.).

It should be noted that non-GPS location technology may be implemented in other settings, and may also be used with personal devices, even devices that also have GPS receivers. For example, beaconing technologies used to track and advertise to individuals through their smartphones while inside large shopping environments like shopping malls may also be used in conjunction with their GPS receivers to located the devices in the same environment, with greater precision than GPS alone. Those skilled in the art will recognize that other location determining and navigation technologies known in the art or yet to be developed may be used in the implementation of a danger monitoring system 200.

At some point after the detection of a potential dangerous event 262 by a danger monitoring device 202, a determination must be made as to whether that event 262 is relevant to a particular danger mitigation device 234. In some embodiments, such a determination may be made by the server 214. For example, each danger mitigation device 234 may report its current location to the server 214. This may happen after a time interval has elapsed, or may be triggered by an input (e.g. accelerometer data, etc.). The server 214, after verifying and locating a dangerous event 262, may determine which mitigation devices 234 need to be alerted based upon their last known location. Devices 234 deemed by the server 214 to be relevant are sent a danger alert 222.

In other embodiments, the determination may be made by each danger mitigation device 234. For example, upon verifying and locating a dangerous event 262, a server 214 may send a danger alert 222 to all known danger mitigation devices 234, each of which compares the event location 224 of the alert 222 with its current location and determines whether to alert the user 274. In some embodiments, only a subset of all known danger mitigation devices 234 may be sent the danger alert 222. For example, the subset may be based upon city or state. As an option, a danger mitigation device 234 may periodically update the server 214 as to which city, state, or other region it is currently in. Performing the relevance determination on the mitigation devices 234 rather than the server 214 may be advantageous, as it would not require the devices 234 to constantly update the server 214 with their location, saving battery power and easing any privacy concerns a user 274 may have about constantly being tracked, in addition to listened to. In some embodiments, a user 274 may manually trigger an update (e.g. device 234 asks for latest information from server 214, device 234 compares location with last received danger alert 222, etc.) if they feel they have missed vital information due to loss of network connectivity or other reasons.

In some embodiments, the danger mitigation device 234 may also be a danger monitoring device 202. For example, in some embodiments, a smartphone 264 may comprise software (and in some cases specialized hardware) that allows it to function as a monitoring device 202 as well as a mitigation device 234. Such an implementation is advantageous for a number of reasons. It ensures that at least one monitoring device 202 is present with an individual who is relying on a mitigation device 234 to provide help in case of a dangerous event 262. Additionally, the mitigation functionality incentivizes individuals to allow their personal devices to be used as danger monitoring devices 202.

As shown, the third memory 240 of a mitigation device 234 comprises map data 242. According to various embodiments, the mitigation device 234 may provide a user 274 with an escape route to avoid hazards and get to shelter or safer locations. In some embodiments, the escape route may make use of a generalized map (e.g. street level, building outlines, business names, etc.) that is localized to the device 234, avoiding the need for potentially slow downloads in the urgency of a dangerous event 262. In other embodiments, map data 242, including structure-specific map data (e.g. floor plans, blueprints, etc.) may be provided to a mitigation device 234 through the network interface 236 and thereafter stored in the memory 240.

In still other embodiments, a locally stored generalized map data may be supplemented with more detailed (e.g. structure-specific) map data of the immediate surroundings that is received over the network interface 236 in response to a dangerous event 262. Such a combination may be advantageous, as it allows a mitigation device 234 to provide initial information immediately while more detailed map data 242 is being received, it reduces the amount of information that needs to be sent and received, thus increasing responsiveness, and it may facilitate the continuous updating of structure-specific mapping data at the server as more information is obtained from commercial entities and local governments. Map data 242 may be stored in the memory 240 of a danger mitigation device 234 using any format known in the art.

According to various embodiments, a danger mitigation device 234 may further comprise a camera 246. A camera 246 may be used to obtain and provide needed information to one or more of law enforcement, fire, or rescue (e.g. a user 274 may be prompted to take a photo of another's injury for emergency triage information, provide a photo of a person or object associated with the dangerous event 262, etc.). In some embodiments, the camera 246 may be used to provide navigational information, like an escape route, to a user 274 using augmented reality. As a specific example, navigation information or prompts (e.g. arrows, lines, paths, labels, etc.) may be presented on the screen 238 superimposed over a video feed from the camera 246 such that they look like they are part of the environment surrounding the user 274. Using augmented reality to convey navigational information, or to contextualize instructions (e.g. "lock this door" with an arrow pointing to a door, etc.) is advantageous over other methods, as it does not require a user 274 to determine a proper orientation as conventional maps might, and reduces the chance for confusion. It may be very difficult for a user 274 to remain clear headed in the chaos that often accompanies the types of dangerous events 262 a monitoring system 200 can observe.

Geographic locations and segments of society that are exempt from the possibility of the dangerous events contemplated herein are rare. A danger monitoring system 200 may be beneficial to people ranging from children to the elderly, and from the healthy to the infirm. Some embodiments of the danger monitoring system 200 may be adapted to meet the specific needs of each user 274, such that each user 274 may receive the most effective assistance in the midst of a dangerous event 262. This adaptation may be accomplished by first understanding the capacity and limitations of a specific user 274. In some embodiments, this is facilitated by the creation and storage of a user profile 284.

As shown in the non-limiting example of FIG. 18, the third memory 240 of a danger mitigation device 234 may comprise a user profile 284, which contains data regarding the one or more preferences, capacities, or limitations of a particular user 274. In some embodiments, the user profile 284 may be stored and referenced entirely on the mitigation device 234, while in others it may be stored on the danger monitoring server 214, which may use the information to tailor the data sent to the user 274 during a dangerous event 262 to best suit their needs. In some embodiments where the profile 284 is not confined to the mitigation device 234, the user profile 284 may comprise some form of unique identifier to associate the profile 284 with a user 274, a specific mitigation device 234, or both. The use of such an identifier (e.g. user identifier 412 of FIG. 20) will be further discussed with respect to FIG. 20.

A user profile may be created before a dangerous event has occurred, but sometimes it may not be updated until a moment of need. For example, a user may forget to update their profile to include the fact they have a cast on their leg until they are in the middle of an emergency and are being instructed to ascend three flights of stairs. In some embodiments, a user 274 of a danger mitigation device 234 may be able to update their profile to include additional parameters during the emergency. As an option, the user may be limited to choosing between a limited number of generalized statements, to avoid wasting time or creating confusion.

In some embodiments, a user profile 284 may comprise an age 288 of a user. The age 288 may be specific, or one of a number of age ranges about which certain assumptions may be made. The information provided through a danger mitigation device 234 may be adapted based upon the age of the user 274 associated with that device 234. Absent additional, more detailed information addressing specific areas of capacity or limitation, a user's age may be used to make assumptions about, and subsequently adapt to, abilities such as literacy. For example, a young child might be able to read, but very slowly, so instructions may be presented in a graphical or iconic form, possibly accompanied by audio. An older child may be provided text, including simplified text, to decrease an amount of the time needed for comprehension and to assist the older child in staying focused on getting to shelter or a safer location. An adult may be presented with more information, possibly including details about the danger being faced, as they can read fast enough to take it in without impeding their efforts to get to shelter or a safer location. In some embodiments, children may be able to specify an avatar 286, such as a cartoon or comic character who will present them with information and instructions. The use of an avatar 286 to interact with a user 274 (adult or child) may help keep them calm during the event 262, and is particularly powerful when coupled with augmented reality, as previously discussed (e.g. chosen avatar can be seen walking along the escape route, providing encouragement, etc.).

A user's age may also be used to make assumptions about the speed with which a user 274 will be able to move. Knowing an estimated movement speed may allow a server 214 or mitigation device 234 to determine which path to provide to a user 274. For example, one path may lead to a more secure location, but may include a longer segment close to the locus of danger, making it less ideal for a user who may move slowly, who in turn may be better off sheltering in place. In some embodiments, age 288 may be used to estimate the viability of including stairs or the like in an escape route for a particular user 274. A user's age may also be used to decide between instructing escape or to shelter in place. For example, age 288 may be used to assume whether a user 274 is experienced enough to know how to lock a door, or strong enough to barricade a door.

According to various embodiments, a user profile 284 may contain information about a user's specific limitations, which may be used to tailor information, escape plans, and the like, for their particular capacities. One type of limitation which may be described in a user profile 284 and used to adapt the plans and instructions presented is mobility.

A user's stored mobility limitations may be conclusory, descriptive, or both. Conclusory statements of mobility limitations may be treated as absolute criterion that must be honored when formulating a response plan for the user. For example, "cannot use stairs" would exclude any escape routes involving stairs, while "requires assistance" would result in shelter-in-place instructions coupled with instructions sent to first responders. Descriptive statements of mobility limitations may be used when deciding between multiple possible response plans for a user. Some limitations, while not making a particular plan impossible, may render it more dangerous than other plans. Descriptive statements of mobility limitations may include, but are not limited to, location of impairment (e.g. which limb(s) or other body parts are impaired, etc.), the nature of impairment (e.g. broken bone, paralysis, missing limb or limbs, etc.), type of mobility aid (e.g. cane, walker, crutches, braces, wheelchair, sling, cast, etc.), and the like. Another descriptive statement may be an estimated speed of mobility, which may be vague (e.g. slow, medium, etc.) or specific (e.g. time to travel 100 feet, or some commonly demarcated length, like a football field, etc.), and which may be accompanied by a maximum duration (e.g. how long or how far can they travel at that speed). The description of mobility limitations may also include the type of impairment, whether permanent or temporary. As an option, in some embodiments, a user may specify a temporary impairment as having an expiration date or duration, such as when their cast is going to be removed, and the profile may automatically adapt accordingly.

The danger monitoring system 200 may chose one plan over another in light of the limitations specified by the user 274. For example, a user on crutches may be directed to follow a longer escape route to avoid stairs because the system 200 has determined that the increased length does not increase the risk of harm beyond the risk associated with another plan, such as sheltering in place. A user with a cane may be directed along a longer cement path rather than across a lawn.

Another type of limitation which may be described in a user profile 284 and used to adapt the plans and instructions presented, and possibly how they are presented, is sensory impairment. Sensory impairments may include, but are not limited to, visual impairments (e.g. impaired visual acuity, colorblindness, poor night vision, blind in one or both eyes, etc.), auditory impairments (e.g. reduced hearing in one or both ears, deaf in one or both ears, etc.), or both. In some embodiments, a user profile 284 may also indicate what aids a user has to assist with their sensory limitations (e.g. glasses, service animal, knowledge of Braille, hearing aid, knowledge of sign language, cochlear implant, etc.). According to various embodiments, such information may be used to adapt how a plan or instructions are presented (e.g. color scheme used on screen 238, size of text on screen 238, volume of audio, visual indicators of audio alerts, contrast of user interface elements, brightness of screen 238, visual vs. spatial descriptions, etc.). As a specific example, an instruction normally stated via audio as "enter the second to last door on the right" might be revised to "enter the fourth door on your right, approximately 30 yards straight ahead" for a blind user. Another specific example is a deaf user may receive tactile feedback (e.g. vibrations) in place of audio alerts (e.g. "stop"). In some embodiments where the danger mitigation device 234 comprises a camera 246, a visually impaired user 274 may have the option of pointing the camera in a direction, and having the scene described through audio using machine learning and machine vision, as is known in the art (e.g. "there is a fire ahead and to the left", etc.).

The sensory limitations described may also be used to adjust the specifics of the plan or instructions themselves (e.g. favoring a longer path with straight segments over a shorter twisty path). In situations where the server 214 has determined that the locus of danger (e.g. active shooter, etc.) is moving around within a building, a choice between shelter in place and run to shelter may depend upon a user's specified visual acuity or blindness. Additionally, a plan or escape route may be modified to avoid environments that may be dangerous due to a users specified sensory limitation (e.g. busy roads, outdoor steps without handrails, etc.).

In various embodiments, a user profile 284 may also include psychological or mental limitations, which may be used in the formulation and presentation of a response plan. In some embodiments, such limitations may be described and utilized in a very general manner. For example, a profile may specify the degree to which the impairment would hamper self evacuation (e.g. no impediment, cannot go alone, needs trained assistance, etc.). In some embodiments, specified limitations may be used to modify what information is presented, how it is presented, or both. For example, descriptions of the danger may be kept vague for someone with a severe anxiety disorder. In still other embodiments, specific aspects of a mental or psychological limitation may be indicated, and plans tailored accordingly. As a specific example, a user profile 284 may list extreme phobias, such as heights or water, and an escape route may be modified to avoid stairwells and fountains.

In some embodiments, some aspects of the user profile 284 may be shared with rescue personnel to aid them in assisting the user get to shelter or get needed treatment. For example, rescue personnel might be told what equipment may be needed (e.g. wheelchair, stretcher, etc.), or what additional factors will have to be addressed (e.g. user has a service animal, etc.).

In some embodiments of the danger monitoring system 200, a user 274 or a guardian may provide one or more details to be included in the user profile 284 through a computing device, including but not limited to the mitigation device 234. In other embodiments, a danger mitigation device 234 may assist with the creation of a profile by walking a user through a series of activities to ascertain their limitations. Examples include, but are not limited to, timing them while traveling a specified distance (e.g. using property-specific map data and telling the user to walk to the end of the hallway they are currently standing in, etc.), presenting text in a variety of font styles and sizes so the user can choose the most comfortable, providing access to digital medical records to directly obtain limitation descriptions, providing a rudimentary (i.e. non-diagnostic or FDA regulated) testing of visual and auditory acuity, and the like.

A danger monitoring system 200 may also be used to facilitate the operations and oversight of law enforcement and other agencies who may be responding to a dangerous event 262. According to various embodiments, a danger monitoring system 200 may further comprise one or more video recording devices 248. In the context of the present description and the claims that follow, a video recording device 248 is a device capable of capturing and storing video, analog or digital. Examples of video recording devices 248 include, but are not limited to, wearable bodycams 278, dashboard cams (or other vehicle-mounted cameras), surveillance cameras, traffic cameras, red light/intersection cameras, and the like. In some embodiments the video recording devices 248 may be limited to devices operated by a government agency like a police department, while in other embodiments the video recording devices 248 may also include devices owned, operated, or located on the property of private or corporate entities. Examples include, but are not limited to, security cameras, ATM cameras, weather monitoring stations, and the like.

As shown, a video recording device 248 comprises a camera 250, a fourth processor 252, a fourth memory 254, and a fourth network interface 256. The camera 250 is capable of capturing video, and may or may not include a microphone to capture audio. According to various embodiments, upon receipt of a danger alert 222, a video recording device 248 will begin to retain recorded video in the memory 254 of the video recording device 248. In some embodiments, the video recording device 248 may be configured to continuously record, but only maintaining a predefined interval of time of footage (e.g. the last 10 seconds, 30 seconds, 2 minutes, 10 minutes, etc.). Upon receipt of a danger alert 222, the already-captured interval may be saved, as well as additional video footage, until the video recording device 248 is given a stop command. In this way, footage of events leading up to the receipt of a danger alert 222 may be captured. The predefined interval of time may be chosen based upon the average time between first detection of an event by a danger monitoring device 202, and the broadcasting of a danger alert 222.

In other embodiments, the video recording device 248 may only start recording footage after a danger alert 222 has been received. In still other embodiments, the video recording device 248 may be configured to respond to a danger alert 222 in either of these manners, which may be determined based upon policies of participating government agencies, such as law enforcement. In still other embodiments, a video recording device 248 may already be constantly recording and storing video (e.g. stop-light cameras, security cameras, dashboard cameras, etc.). In such cases, the receipt of a danger alert 222 may result in the video recording device 248 retaining a marker noting the receipt, to assist in reviewing the footage at a later time.

In some embodiments, a video recording device 248 may also be a danger monitoring device 202. In such embodiments, the video recording device 248 may have threshold criteria that differ from the threshold criteria of other danger monitoring devices 202. For example, danger monitoring devices 202 that are also mobile phones possessed by private citizens may only monitor for signs of dangerous events 262, such as gunshots and explosions, while danger monitoring devices 202 that are also bodycams 278 worn by police officers may also monitor for the signs that may precede a dangerous event 262. For example, in some embodiments, a danger monitoring device 202 may monitor for sounds associated with events and behavior that potentially can escalate a conflict to a dangerous event 262, including but not limited to the sounds or sound intensities associated with shouting, slamming doors, or screams. Threshold criteria will be discussed in greater detail below, with respect to FIG. 19.

The network interface 256 of the video recording device 248 may be different from the network interfaces of other devices discussed above. For example, in some embodiments, a video recording device 248 may not also be a danger monitoring device 202, and thus does not need to send information, only receive. In such embodiments, the network interface 256 of the video recording device 248 does not need to be able to transmit, or be able to transmit with sufficient power to communicate directly with a server 214, cellular network, or other form of widespread network.

In some embodiments, the network interface 256 of a video recording device 248 may be as simple as a microphone able to receive signals outside the range of human hearing. As a specific example, a danger alert 222 may be transmitted by the server 214 over a radio network as a digital signal 280 that may be outside the range of human hearing, and may include one or more device identifiers associated with a video recording device 248. When the video recording device 248 detects its own identifier over an emergency services radio 282, it may begin to retain recorded video, as previously discussed.

Additionally, in many cases, a video recording device 248 is used in close proximity with other equipment, such as radios and vehicles. In some embodiments, a video recording device 248 may be communicatively coupled to a server 214 through a vehicle, mobile computing device, radio, or other agency-issued equipment. By piggybacking on the link provided by already networked equipment, the battery life of the video recording device 248 may be extended. In still other embodiments, the network interface 256 of the video recording device 248 may provide a direct link to a network 258. As an option, the device 248 may be configured to transfer stored video, or stream live video, to the danger monitoring server 214 or other server for storage, analysis, or both.

In some embodiments, the video recording device 248 may be given a command to stop recording by directly interacting with the device 248. In other embodiments, the video recording device 248 may only stop retaining video in the memory upon receipt of a stop signal from the server 214 or an authorized remote device (e.g. device at a command center, etc.). In still another embodiment, the video recording device 248 may continue to record and retain video until a certain amount of time has elapsed (e.g. 2 hours, 5 hours, etc.) to ensure nothing is missed.

In some embodiments, a video recording device 248 may further comprise a GPS receiver 257 or similar technology (as previously discussed with respect to the danger mitigation device 234), while in other embodiments, a video recording device 248 may be devoid of such technology, and may rely on other devices within the system 200 to provide location data. For example, in some embodiments, the location of a bodycam 278 may be obtained from a GPS-equipped vehicle (e.g. patrol car, ambulance, etc.) or other issued equipment (e.g. mobile device, radio, etc.) specific to the individual wearing that particular bodycam 278. Such a configuration may reduce the overall cost of a bodycam, as well as increase its battery life. Furthermore, such a configuration may be advantageous if the video recording device 248 is already making use of equipment within a vehicle or on a person to communicate with a danger monitoring server 214.

Figure 19:
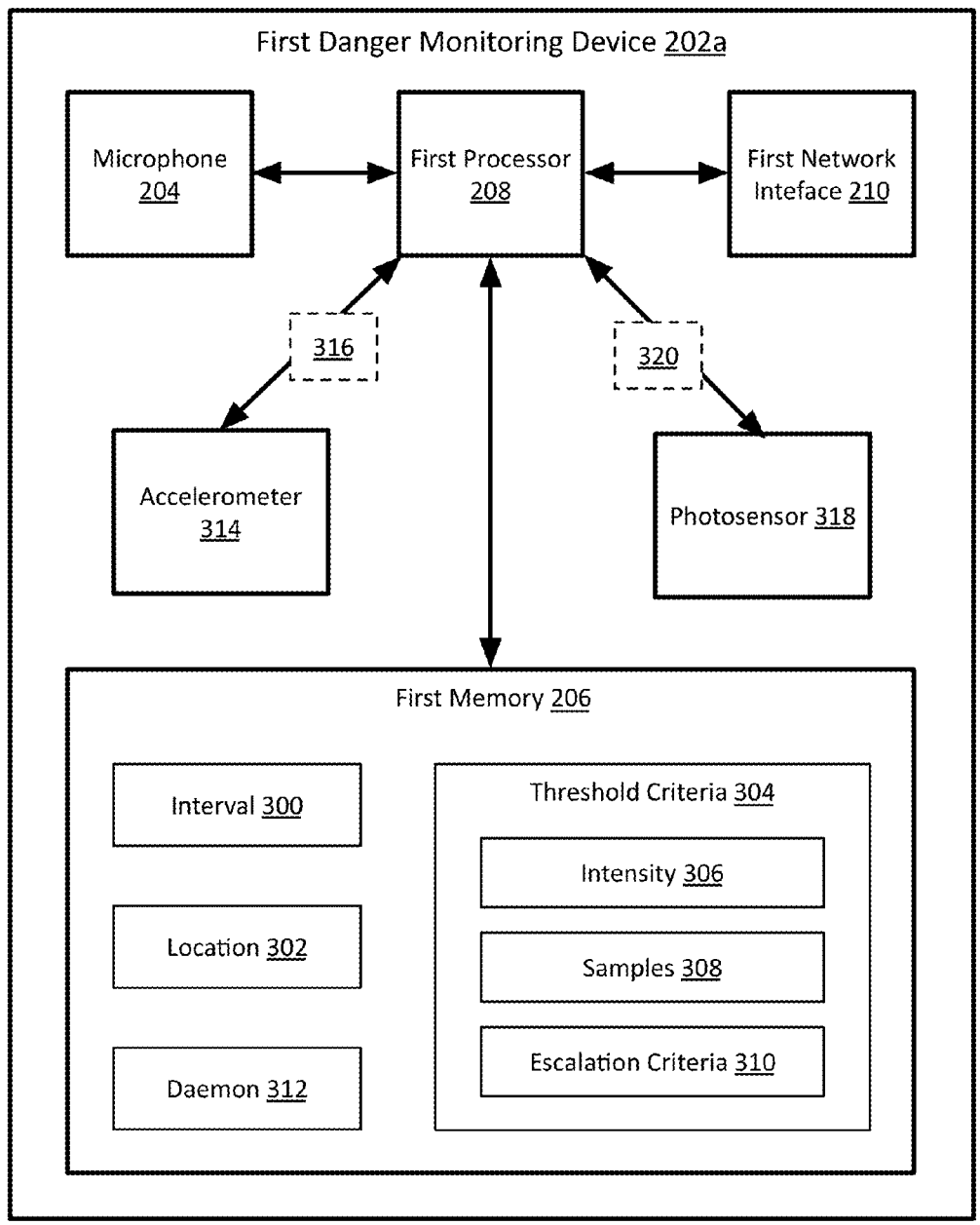
FIG. 19 is a schematic view of a danger monitoring device.

FIG. 19 is a schematic view of a non-limiting example of a danger monitoring device 202*a*. As shown, the danger monitoring device 202*a* comprises a microphone 204, a first memory 206, a first processor 208, and a first network interface 210 through which it is communicatively coupled to a network 258. In some embodiments, the danger monitoring device 202*a* further comprises additional sensors, such as an accelerometer 314, photosensors 318 or other light sensitive device such as a camera, or both.

As shown, the memory 206 of the danger monitoring device 202*a* comprises an interval 300 of the most recently digitized environmental sound 260. As previously discussed, the monitoring device 202*a* retains and analyzes the sound that is continuously digitized by the microphone 204, in predefined intervals. According to various embodiments, the interval size may be chosen such that it is likely to contain enough of the sound of a dangerous event 262 that is can be identified as such, and can be distinguished from multiple possible events 262 (e.g. type of gun, etc.). For example, the interval may be set to be long enough to capture two or more shots from an automatic weapon, to distinguish it from single shots.

In some embodiments, the intervals being analyzed by the danger monitoring device 202*a* may overlap with each other. For example, the second interval being analyzed may contain the last half of the first interval. The degree of overlap may vary from one embodiment to another. By using overlapping intervals for analysis, it is less likely that the sound of a dangerous event 262 will be missed because it was at the edge of an interval.

Additionally, the memory 206 of the danger monitoring device 202*a* may comprise a location identifier 302 associated with the current location of the device 202*a*. In some embodiments, the device 202*a* may comprise a GPS receiver or similar technology, and the location identifier 302 may comprise a regularly updated location (e.g. street address, latitude/longitude coordinates, etc.). In some embodiments, the danger monitoring device 202*a* may be in a fixed location, such as stationary sound monitoring device 272 of FIG. 18. In such embodiments, the location identifier 302 may simply be a device identifier that may be correlated with a geographic location stored at the danger monitoring server 214.

As mentioned above, the danger monitoring device 202*a* analyzes the interval 300 of digitized sound to determine if a dangerous event 262 occurred. According to various embodiments, the danger monitoring device 202*a* may determine if a dangerous event 262 has occurred by determining if the sound captured in the interval 300 meets one or more threshold criteria 304 stored in the memory 206. In the context of the present description and the claims that follow, a threshold criteria 304 may be a discernable property of a digitized sound that may be indicative of a dangerous event 262.

One example of a threshold criteria 304 is a threshold sound intensity 306. Some dangerous events 262 are associated with sounds whose intensity is much higher than normal environmental sounds. Examples include, but are not limited to, gun fire, explosions, structural damage to buildings, and high energy vehicle impacts. In some embodiments, one or more threshold criteria 304 may be threshold sound intensities 306. One exemplary intensity is sounds over 100 decibels.

Another example of a threshold criteria 304 is a plurality of sample sounds 308 associated with dangerous events 262, that the danger monitoring device 202*a* can compare against the interval 300. In some embodiments, the memory 206 may contain a number of audio samples of different types of dangerous events 262, while in other embodiments the memory 206 may contain audio fingerprints of those events. The use of audio fingerprints may facilitate a quick analysis that requires minimal processing power. As a specific example, an audio fingerprint may be used by a danger monitoring device 202, which may send the actual captured audio to the server 214 for a more detailed analysis using a more powerful, dedicated processor 218. The danger observation data 212 will be discussed in greater detail with respect to FIG. 21.

A third example of a threshold criteria 304 is a range of one or more of intensities, samples, fingerprints, or content 310 associated with escalating events. As previously discussed, in some embodiments, danger monitoring devices 202 may be associated with law enforcement or other emergency responders (e.g. body cams 278, dashboard cams, etc.). Such devices may comprise threshold criteria 304 specific to signs of escalation towards a dangerous event, such as yelling, shouting, slamming doors, animal sounds, and the like, as previously discussed. Such escalation sounds may be identified by their characteristic intensities in some embodiments, while in others they may be identified through audio fingerprinting. In some embodiments, the content of talking or yelling may be identified through speech recognition and compared against a list of words or phrases that constitute escalating events.

In some embodiments, a video recording device 248 may be owned by a private citizen, and configured with custom threshold criteria that only triggers recording, rather than communicating with a danger monitoring server 214. As a specific example, a threshold may be set such that recording is triggered by a loud shout of "surprise!" at a party. This may serve as an additional bit of functionality that may be useful to a private citizen, and may further incentivize them to power and maintain a device that also detects and reports dangerous events.

These examples of threshold criteria are based upon recorded sound, and are not limiting. Other examples may be based upon other phenomenon. For example, accelerometers 314 may be used to detect the forces associated with a high-speed vehicle impact. Radiation sensors may detect unusual levels of radiation that may indicate a weapon. Other threshold criteria 304 may be based upon any of the sensors discussed above, or known in the art.

In some embodiments, a danger monitoring device 202 may be a specialized piece of hardware. In other embodiments, the monitoring device 202 may be implemented in a commonly owned device, such as a mobile device 264. In some embodiments, a mobile device 264 may comprise specialized hardware (e.g. separate audio processor, memory, etc.) to implement the monitoring device 202. In other embodiments, the memory 206 of a mobile device 264 may comprise a daemon 312 that runs in the background of the mobile operating system, such that audio is continually digitized and analyzed according to one or more threshold criteria 304.

The use of sound intensities as threshold criteria 304 is advantageous in that it is easy to determine with minimal processing power. However, the use of such criteria may be problematic when the danger monitoring device 202 is also a mobile device 264 owned by a private citizen. People carry their mobile devices 264 in a variety of ways (e.g. in a pocket, in a purse, etc.) when not holding it in their hand. A mobile device 264 held out in the open may correctly identify a sound as being loud enough to be a gunshot. However, that same device, in a purse, may not recognize that same sound as being loud enough. In some embodiments, a danger monitoring device 202 may determine whether it is covered, and adjust some or all of its threshold criteria 304 accordingly.

For example, in an embodiment, the danger monitoring device 202*a* may comprise an accelerometer 314 that sends orientation data 316 to the processor 208. The orientation data 316 may be used to determine if the device is being held, is laying on a flat surface (e.g. table, desk, etc.), or is being carried in a closed environment (e.g. in a pocket, in a purse or bag, etc.). In another embodiment, a similar determination may be made using ambient light level data 320 provided by a photosensor 318 or the like. In other embodiments, data from both sensors, or other sensors known in the art, may be employed to determine whether threshold criteria 304 should be adjusted.

Figure 20:
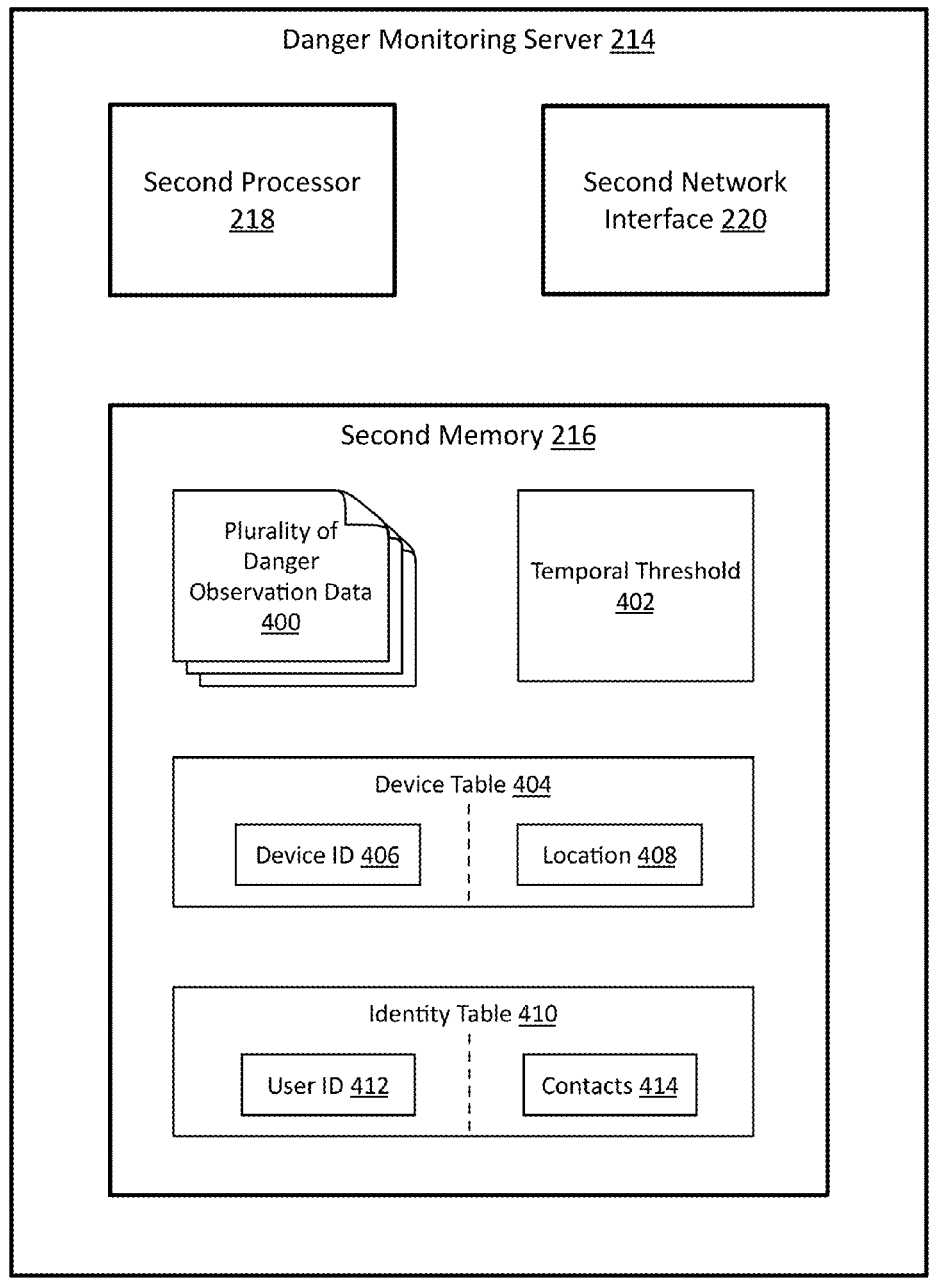
FIG. 20 is a schematic view of a danger monitoring server.

FIG. 20 is a schematic view of a non-limiting example of a danger monitoring server 214. As shown, the danger monitoring server 214 comprises a second memory 216, a second processor 218, and a second network interface 220 through which it is communicatively coupled to monitoring devices 202 and other devices via a network 258.

As previously discussed, once a danger monitoring device 202*a* has determined that one or more threshold criteria 304 have been met by an interval 300 of digitized sound, a first danger observation data 212 is sent to the server 214. The danger observation data 212 will be discussed in greater detail with respect to FIG. 21. As shown, the danger observation data 212 is stored in the second memory 216 along with a plurality 400 of danger observation data received from a plurality of monitoring devices 202.

Upon receipt of a new danger observation data 212, the danger monitoring server 214 verifies that a dangerous event 262 has actually occurred. According to various embodiments, the dangerous event 262 may be verified by comparing the audio data of the observation data 212 with the audio data of potentially related data in the plurality 400 of observation data. One example of determining that an observation data is potentially related is if it exists within a temporal threshold 402. In other words, the audio data will be compared with audio data that was observed within a certain amount of time before or after the audio data was recorded. The size of the temporal threshold 402 may be based upon a maximum distance from a dangerous event that a sound would meet a threshold criteria, in ideal conditions. Data outside such a window could be ignored while verifying the audio data of the new danger observation data 212.

After identifying relevant data, the server 214 may compare the associated audio data with the audio data of the latest received data to verify that it is a dangerous event. Examples of such comparison include, but are not limited to, comparison of observed sound intensity, comparison of the waveform of the recorded audio, and comparison of audio fingerprints. In some embodiments, verification may also comprise comparison with known sounds of dangerous events (e.g. the server 214 may have a larger/higher fidelity library of sample sounds).

In cases where no other potentially related data is found in the memory, the sever 214 may make a note of a potential but unverified event; if additional data is not received within the temporal threshold 402, it may be that only a single monitoring device 202 heard the event. In some embodiments, such a case may be treated as a "wait and see" situation, waiting for verification from other sources (e.g. 911 calls, dispatch, social media, etc.); as an option, a soft warning may be sent to some danger mitigation devices 234. In other embodiments, the case may be escalated to a human operator to make a determination as to whether it should be deemed a dangerous event. In still other embodiments, the server 214 may make a final analysis of the audio data and determine whether the probability that it describes a dangerous event is above a predetermined limit, beyond which verification is automatic.

As previously discussed, in some embodiments, part of verification may include examination of the location associated with the audio data, and comparing it with areas of "known danger", where the sounds of dangerous events are commonplace, expected, and pose no threat, such as a shooting range or a fireworks show.

Once an event has been verified by the server 214, it is located. As previously discussed, the location data, timestamp, and audio data (e.g. intensity, pitch, etc.) of various data deemed to be related may be used by the server 214 to triangulate the actual location of the dangerous event. In some embodiments, the server 214 may make use of the related data, particularly the location, timestamp, and various aspects of the audio to differentiate between multiple events and a single event with observed echoes.

Determining the location of the dangerous event 262 based upon locations, timestamps, and sound intensities, makes use of the speed of sound. In some embodiments, the server 214 may retrieve environmental information that may affect the propagation of sound (e.g. air temperature, humidity, cloud ceiling, fog, etc.) from networked sensors, or third party servers (e.g. weather service, public weather stations, etc.).

In addition to location, a timestamp may be calculated for the dangerous event, based upon the timestamps of the pertinent data. In some embodiments, the timestamp may be calculated using the distances of the monitoring devices from the determined location of the event and their reported timestamps. As previously discussed, the determination of the actual time of the event may be beneficial in validating data from faulty devices, as well as validation of later data.

In some embodiments, verification and location may be declared without analysis, based upon the source of the initial data. For example, in some embodiments, the server 214 may be tied into a police dispatch system, such that a reported shooting or other event may be integrated into the system, and the danger alert 222 may be sent to the danger mitigation devices 234 immediately. Filters may be used to prevent certain types of events, or particular details, from being sent out, to address privacy concerns.

Once the event has been verified and located, a danger alert 222 may be sent. In some embodiments, the server 214 may continue to gather and validate data related to the event, to obtain a more accurate location or more precisely identify the nature of the event. In other embodiments, each event may be treated as discrete and separate, partitioned by the temporal threshold. In still other embodiments, the server 214 may correlate validated events located in proximity to each other and occurring in a small time window, perhaps providing a path of a mobile dangerous event (e.g. a shooter moving through a building, etc.).

As previously discussed, some danger monitoring devices 202 are stationary, and may only communicate some form of device identifier 406. The server 214 may comprise a device table 404 correlating device identifiers 406 with physical locations 408 of the stationary devices.

As previously discussed, in some embodiments, the system 200 may alert one or more related parties 276 on behalf of a user 274 in proximity to a dangerous event 262. The server 214 may comprise an identity table 410 that correlates user identifiers 412 with one or more emergency contacts 414 (e.g. email, text/voice number, etc.). In some embodiments, the user identifier 412 may be a unique alphanumeric index associated with a user, but not identifying the user explicitly. The user identifier 412, the identity table 410, or both, may contain a partial or full name, to be used in the status notification 228 sent to the emergency contacts.

Figure 21:
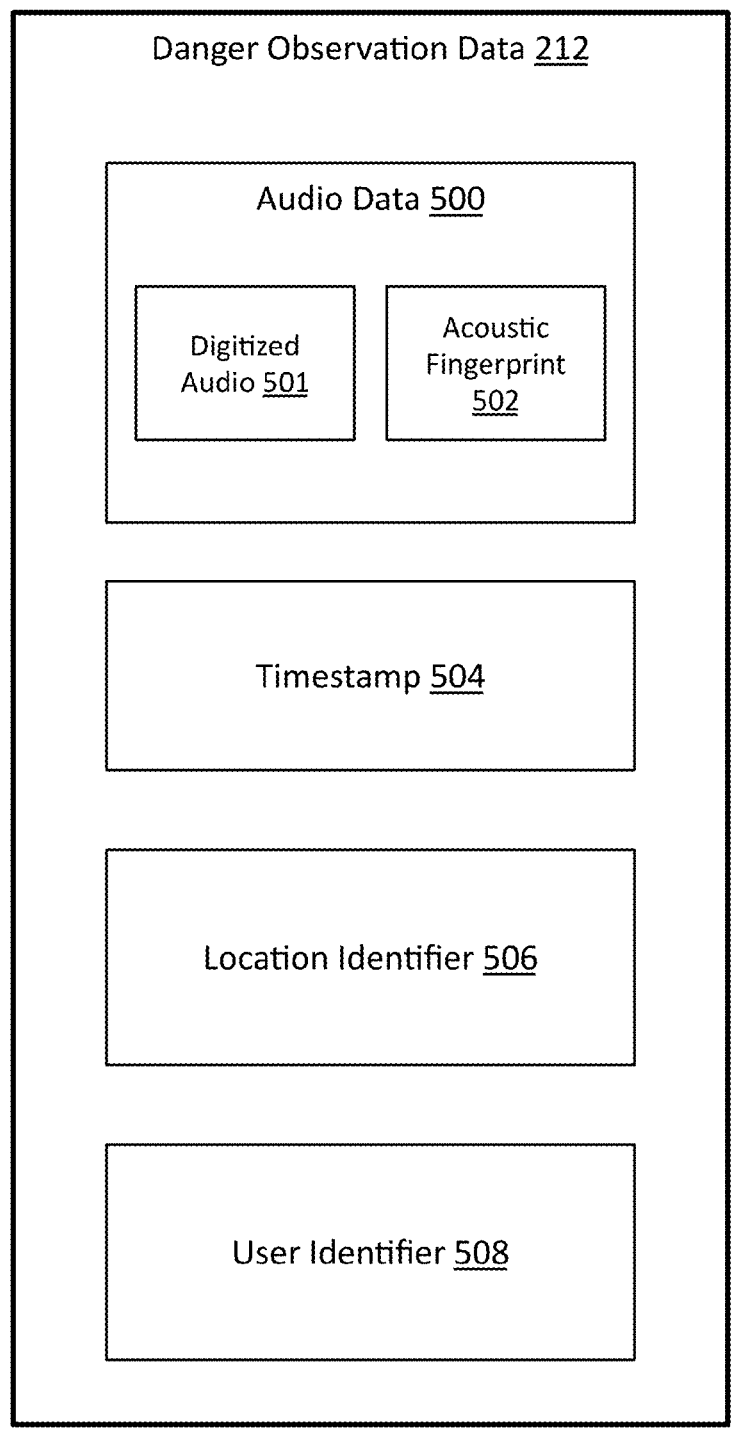
FIG. 21 is a schematic view of a danger observation data.

FIG. 21 is a schematic view of a non-limiting example of a danger observation data 212 sent by a danger monitoring device 202 to a danger monitoring server 214, according to various embodiments. As shown, a danger observation data 212 comprises an audio data 500, a timestamp 504, a location identifier 506, and a user identifier 508.

As previously discussed, in some embodiments, the audio data 500 may further include an acoustic fingerprint 502, as is known in the art. In some embodiments, the audio data 500 may be modified by the danger monitoring device 202 in light of a determined sound modifier (e.g. sound amplified to compensate for being in a pocket, etc.). In other embodiments, the audio data 500 may be transmitted unmodified, as the monitoring device 202 recorded it, and the data 212 may further include a description of the observed sound modifier, either in summary (e.g. "pocket", "purse", "table", etc.), in detail (e.g. providing the raw sensor data, etc.), or both.

In some embodiments, danger observation data 212 may include a user identifier 508 that specifies, or may be directly linked to, the identity of the user or owner of the originating device 202. For example, the user identifier 508 may be the phone number of the mobile device 264 from which the observation data 212 is originating. As another example, the user identifier 508 may be a unique alphanumeric index that is tied to a record at the server 214 that includes identifying information (e.g. name, address, contact info, etc.) for the user 274 related to the device 202. In cases where the danger monitoring device 202 is associated with an agent of the government, such as a police officer, the user identifier 508 may be a badge number, a car number, radio number, or the like.

In other embodiments, the user identifier 508 of a danger observation data 212 may obfuscate the identity of the user, and may simply provide a unique identification for that monitoring device 202 for the duration of the dangerous event 262. As a specific example, the user identifier 508 may be composed of all or a portion of the location of the device at the initial observation of danger, combined with a segment of random alphanumerics (to further distinguish from other nearby devices). As an option, the server 214 may be configured to delete any identifying information that may accompany the transmission of a danger observation data 212, such as an IP address or other networking information.

The obfuscation of the identity of a user 274 may be advantageous. Some people may be uncomfortable with their personal devices constantly listening, and then automatically reporting dangerous events to the police or other authorities. Witnesses are sometimes reluctant to come forward after witnessing a crime; it follows that some people will not want to participate in a system that could force them to be identified as a potential witness. The ability to ensure their privacy will be protected may increase participation of private citizens.

As previously discussed, FIG. 5 shows a non-limiting example of navigation information 600 that may be presented to a user through a danger mitigation device 234, such as a mobile device. As shown, the mitigation device 234 may indicate a current location of the device 234 (e.g. "you" 90), the location of the event (e.g. "gunshot detected" 92, 94), and a path 602 to shelter (e.g. the path between 90 and 96 or 98).

In some embodiments, the path 602 generated may be generated such that it shields the user from direct line-of-sight with the dangerous event. For example, the path 602 may place structures (e.g. structure 604) between the dangerous event 262 and the user. In other embodiments, the path 602 may replicate, or may be based in part upon, a premade evacuation plan. In other embodiments, the path 602 may be generated using known structural data and map data, and may be generated using computer optimization algorithms that rate generated paths based upon a perceived risk. Perceived risk may be estimated based upon various parameters, including but not limited to, time spent in line-of-sight with location of dangerous event, time spent in proximity to event, time needed to reach shelter, probability of intersection with path of mobile dangerous event, and the like. Path optimization may be achieved using various known techniques, including but not limited to, simulated annealing (e.g. perceived risk is the energy level), genetic algorithms (e.g. perceived risk is generation value), Monte Carlo simulation (e.g. evaluating the perceived risk for the area surrounding the event and finding minima, etc.), and the like.

In some embodiments, the path 602 or instructions to shelter may be generated by the danger mitigation device 234, based upon information received from the server 214, which may include additional map data. This may be advantageous, as a loss of network connectivity after receipt of the danger alert 222 would not prevent the generation of escape plans or instructions. In other embodiments, the instructions may be generated and provided by the server 214, which may be advantageous as the server 214 has more computing power, and could generate the plans quicker. Furthermore, the server 214 would have the most up to date information, and would not have to transmit detailed structural information to the mitigation device 234 that may not be used. In still other embodiments, the mitigation device 234 may wait for a plan from the server 214, but in the absence of a plan, will generate its own, to the best of its ability, using whatever data it has locally.

Figure 22:
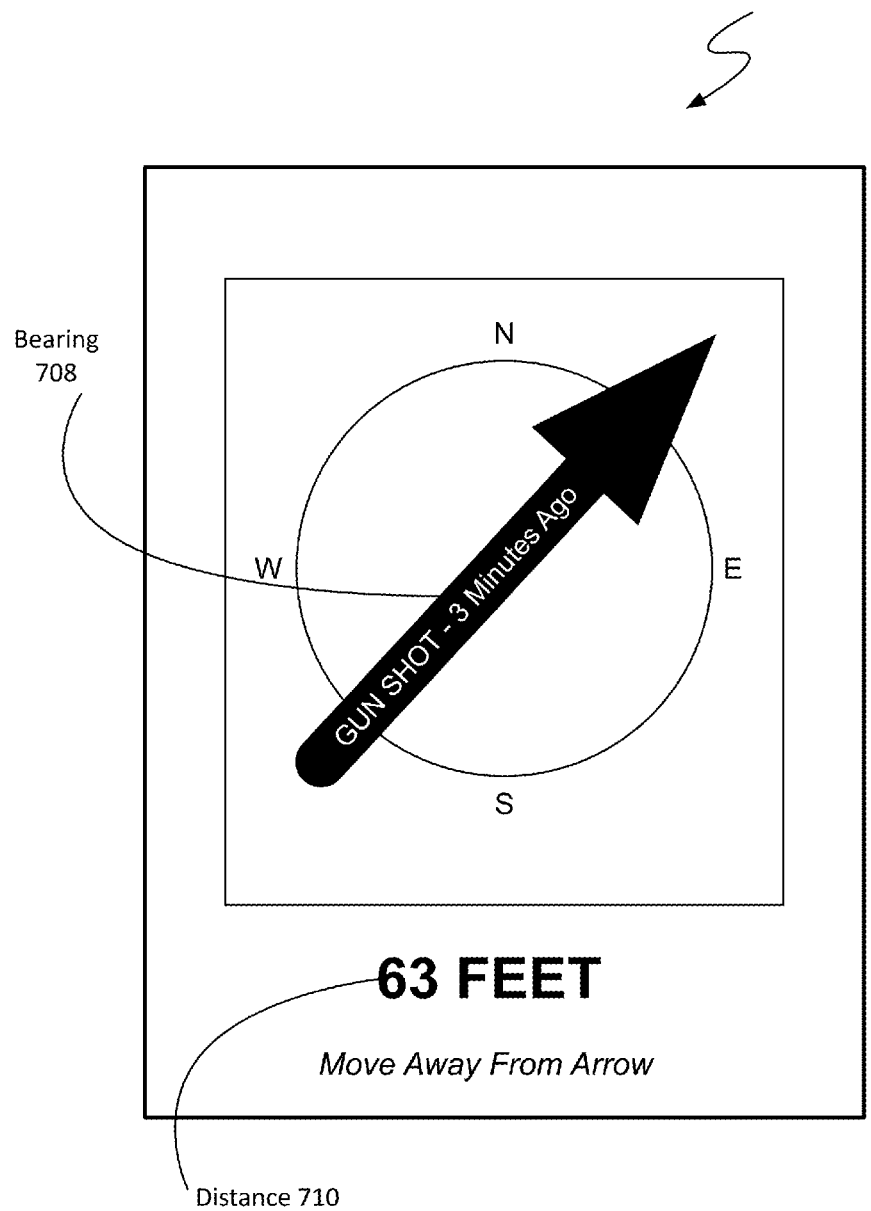
FIG. 22 is an interface view of a danger mitigation device.

FIG. 22 shows an exemplary user interface view of a danger mitigation device 234, according to various embodiments. Previous interfaces discussed made use of maps, and even avatars. In some situations, where map data is not available, or network conditions prevent anything but minimal danger alert 222 data from being sent, a danger mitigation device 234 may employ a minimal interface such as the one shown in FIG. 22, which displays a bearing 608 and distance 610 to the danger event 262. Such minimal information may help a user avoid accidentally moving toward a dangerous event 262, or getting lost in an unfamiliar building. Furthermore, in situations where GPS signals cannot be received consistently, the user may still be guided using an electronic compass and accelerometer data to roughly estimate a user's movement relative to the location of the dangerous event.

Figure 23:
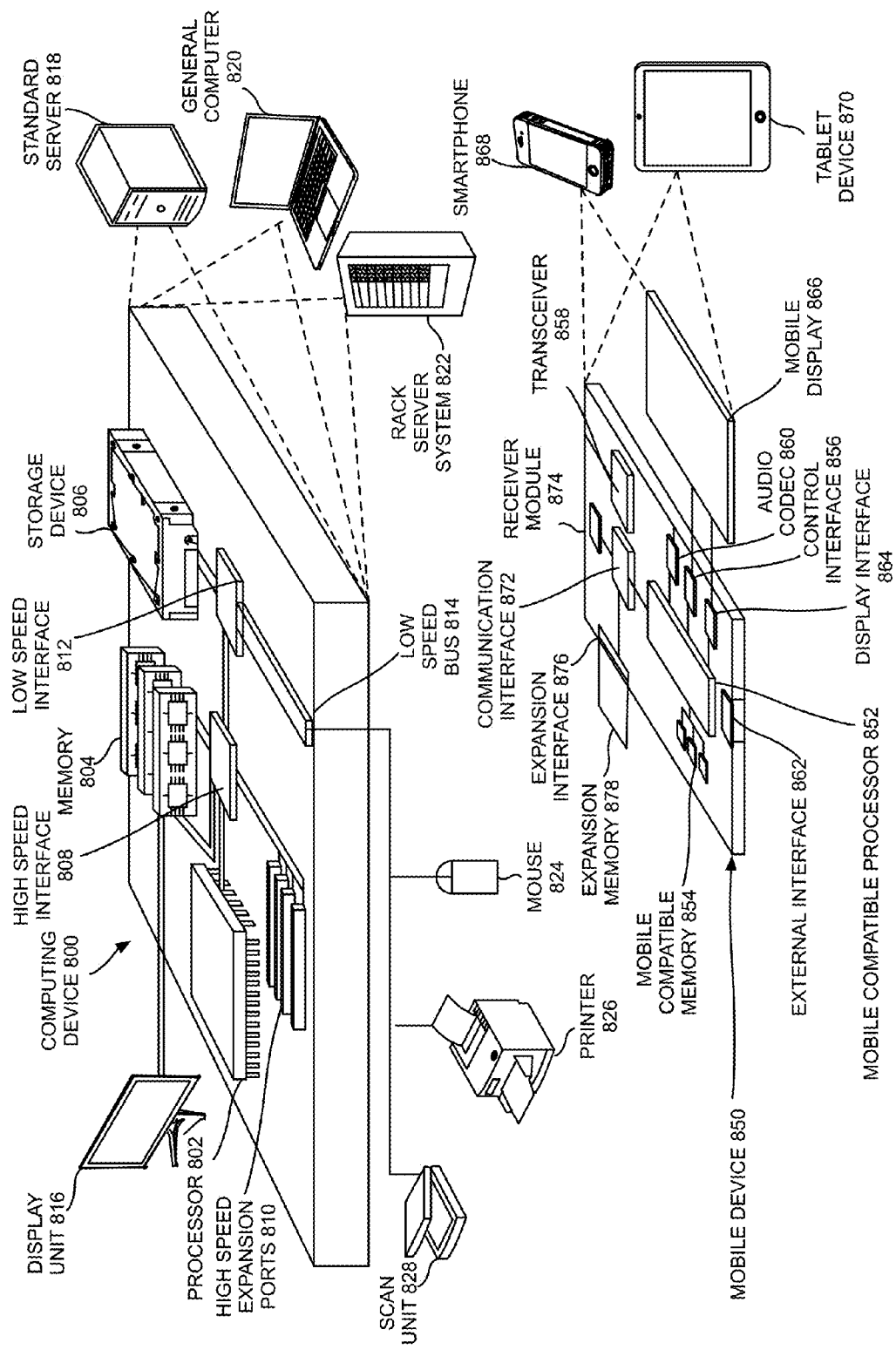
FIG. 23 is schematic diagram of specific computing device that can be used to implement the methods and systems disclosed herein, according to one or more embodiments.

FIG. 23 is a schematic diagram of specific computing device 800 and a specific mobile computing device 830 that can be used to perform, implement, or both, any of the embodiments disclosed herein. In one or more embodiments, one or more of danger monitoring server 214, danger monitoring device 202, or danger mitigation device 234 of FIG. 18 may be the specific computing device 800, according to one embodiment. Also, danger monitoring device 202, danger mitigation device 234, or both, of FIG. 18 may be the specific mobile computing device 830.

The specific computing device 800 may represent one or more various forms of digital computers, such as laptops, desktops, workstations, personal digital assistants, servers, blade servers, mainframes, or other appropriate computers. The specific mobile computing device 830 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described or claimed, according to one embodiment.

The specific computing device 800 may include a processor 803, a memory 805, a storage device 806, a high-speed interface 808 coupled to the memory 805 and a plurality of high-speed expansion ports 810, and a low speed interface 812 coupled to a low speed bus 814 and a storage device 806. In an embodiment, each of the components heretofore mentioned may be inter-coupled using various buses, and may be mounted on a common motherboard or in other manners as appropriate. The processor 803 may process instructions for execution in the specific computing device 800, including instructions stored in the memory 805, on the storage device 806, or both, to display a graphical information for a GUI on an external input/output device, such as a display unit 816 coupled to the high-speed interface 808, according to one embodiment.

In other embodiments, multiple processors, multiple buses, or both, may be used, as appropriate, along with multiple memories or types of memory. Also, a plurality of specific computing device 800 may be coupled with, with each device providing portions of the necessary operations (e.g., as one or more of a server bank, a group of blade servers, or a multi-processor system).

The memory 805 may be coupled to the specific computing device 800. In an embodiment, the memory 805 may be a volatile memory. In another embodiment, the memory 805 may be a non-volatile memory. The memory 805 may also be another form of computer-readable medium, such as a magnetic disk, an optical disk, or both. The storage device 806 may be capable of providing mass storage for the specific computing device 800. In an embodiment, the storage device 806 may be, or include, one or more of a floppy disk device, a hard disk device, an optical disk device, a tape device, a flash memory, or other similar solid state memory device. In another embodiment, the storage device 806 may be an array of the devices in a computer-readable medium previously mentioned heretofore, such as an array of devices, including devices in a storage area network or other configuration.

A computer program may be comprised of instructions that, when executed, perform one or more methods, such as those described above. The instructions may be stored in one or more of the memory 805, the storage device 806, a memory coupled to the processor 803, or a propagated signal.

The high-speed interface 808 may manage bandwidth-intensive operations for the specific computing device 800, while the low speed interface 812 may manage lower bandwidth-intensive operations. Such allocation of functions is exemplary only. In an embodiment, the high-speed interface 808 may be coupled to the memory 805, the display unit 816 (e.g., through a graphics processor, an accelerator, or both), and to the plurality of high-speed expansion ports 810, which may accept various expansion cards.

In the embodiment, the low speed interface 812 may be coupled to the storage device 806 and the low speed bus 814. The low speed bus 814 may be comprised of one or more wired or wireless communication ports (e.g., a Universal Serial Bus ("USB"), a Bluetooth® port, an Ethernet port, or a wireless Ethernet port). The low speed bus 814 may also be coupled to the scan unit 828, a printer 826, a keyboard, a mouse 824, and a networking device (e.g., a switch or a router) through a network adapter.

The specific computing device 800 may be implemented in a number of different forms, as shown in the figure. In an embodiment, the specific computing device 800 may be implemented as a standard server 818, as a group of such servers, or both. In another embodiment, the specific computing device 800 may be implemented as part of a rack server system 822. In yet another embodiment, the specific computing device 800 may be implemented as a general computer 820 such as a laptop or desktop computer. Alternatively, a component from the specific computing device 800 may be combined with another component in a specific mobile computing device 830. In one or more embodiments, an entire system may be made up of a plurality of specific computing device 800, a plurality of specific computing device 800 coupled to a plurality of specific mobile computing device 830, or both.

In an embodiment, the specific mobile computing device 830 may include a mobile compatible processor 832, a mobile compatible memory 834, and an input/output device such as a mobile display 846, a communication interface 852, and a transceiver 838, among other components. The specific mobile computing device 830 may also be provided with a storage device, such as a microdrive or other device, to provide additional storage. In an embodiment, the components indicated heretofore are inter-coupled using various buses, and several of the components may be mounted on a common motherboard.

The mobile compatible processor 832 may execute instructions in the specific mobile computing device 830, including instructions stored in the mobile compatible memory 834. The mobile compatible processor 832 may be implemented as a chipset of chips that include separate and multiple analog and digital processors. The mobile compatible processor 832 may provide, for example, for coordination of the other components of the specific mobile computing device 830, such as control of user interfaces, applications run by the specific mobile computing device 830, and wireless communication by the specific mobile computing device 830.

The mobile compatible processor 832 may communicate with a user through the control interface 836 and the display interface 844 coupled to a mobile display 846. In an embodiment, the mobile display 846 may be a Thin-Film-Transistor Liquid Crystal Display ("TFT LCD"), an Organic Light Emitting Diode ("OLED") display, and another appropriate display technology. The display interface 844 may comprise appropriate circuitry for driving the mobile display 846 to present graphical and other information to a user. The control interface 836 may receive commands from a user and convert them for submission to the mobile compatible processor 832.

In addition, an external interface 842 may be provide in communication with the mobile compatible processor 832, so as to enable near area communication of the specific mobile computing device 830 with other devices. External interface 842 may provide, for example, for wired communication in some embodiments, or for wireless communication in other embodiments, and multiple interfaces may also be used.

The mobile compatible memory 834 may be coupled to the specific mobile computing device 830. The mobile compatible memory 834 may be implemented as a volatile memory and a non-volatile memory. The expansion memory 858 may also be coupled to the specific mobile computing device 830 through the expansion interface 856, which may comprise, for example, a Single In Line Memory Module ("SIMM") card interface. The expansion memory 858 may provide extra storage space for the specific mobile computing device 830, or may also store an application or other information for the specific mobile computing device 830.

Specifically, the expansion memory 858 may comprise instructions to carry out the processes described above. The expansion memory 858 may also comprise secure information. For example, the expansion memory 858 may be provided as a security module for the specific mobile computing device 830, and may be programmed with instructions that permit secure use of the specific mobile computing device 830. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In an embodiment, a computer program comprises a set of instructions that, when executed, perform one or more methods. The set of instructions may be stored on the mobile compatible memory 834, the expansion memory 858, a memory coupled to the mobile compatible processor 832, and a propagated signal that may be received, for example, over the transceiver 838, the external interface 842, or both.

The specific mobile computing device 830 may communicate wirelessly through the communication interface 852, which may be comprised of a digital signal processing circuitry. The communication interface 852 may provide for communications using various modes or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 838 (e.g., radio-frequency transceiver). In addition, short-range communication may occur, such as using one or more of Bluetooth®, Wi-Fi, or other such transceiver. In addition, a GPS ("Global Positioning System") receiver module 854 may provide additional navigation-related and location-related wireless data to the specific mobile computing device 830, which may be used as appropriate by a software application running on the specific mobile computing device 830.

The specific mobile computing device 830 may also communicate audibly using an audio codec 840, which may receive spoken information from a user and convert it to usable digital information. The audio codec 840 may likewise generate audible sound for a user, such as through a speaker (e.g., in a handset smartphone of the specific mobile computing device 830). Such a sound may comprise a sound from a voice telephone call, a recorded sound (e.g., a voice message, a music files, etc.) and may also include a sound generated by an application operating on the specific mobile computing device 830.

The specific mobile computing device 830 may be implemented in a number of different forms, as shown in the figure. In an embodiment, the specific mobile computing device 830 may be implemented as a smartphone 848. In another embodiment, the specific mobile computing device 830 may be implemented as a personal digital assistant ("PDA"). In yet another embodiment, the specific mobile computing device, 830 may be implemented as a tablet device 850.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiments in one or more computer programs that are executable or interpretable on a programmable system including one programmable processor, which may be special or general purpose, coupled to receive data and instructions from, and to transmit data and instructions to, a storage system, one input device, and at least one output device.

These computer programs (also known as programs, software, software applications, or code) comprise machine-readable instructions for a programmable processor, and can be implemented in one or more of a high-level procedural programming language, a object-oriented programming language, in an assembly language, or in a machine language. As used herein, the terms "machine-readable medium" and "computer-readable medium" refer to one or more of any computer program product, apparatus or device (e.g., magnetic discs, optical disks, memory, or Programmable Logic Devices ("PLDs")) used to provide machine instructions, data, or both, to a programmable processor, including a machine-readable medium that receives machine instructions as a machine-readable signal. The term "machine-readable signal" refers to any signal used to provide machine instructions, data, or both to a programmable processor.

To provide for interaction with a user, the systems and techniques described here may be implemented on a computing device having a display device (e.g., a cathode ray tube ("CRT") or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., one or more of visual feedback, auditory feedback, or tactile feedback) and input from the user can be received in any form, including one or more of acoustic, speech, or tactile input.

The systems and techniques described here may be implemented in a computing system that includes a back end component (e.g., as a data server), a middleware component (e.g., an application server), a front end component (e.g., a client computer having one or more of a graphical user interface or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In an embodiment, the client and the server are remote from each other and interact through the communication network.

While a number of embodiments have been described; a person of ordinary skill in the art will understand that various modifications may be made. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in one or more of a machine-readable medium or a machine accessible medium compatible with a data processing system (e.g., a computer system), or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and drawings may be regarded in an illustrative rather than a restrictive sense.

Where the above examples, embodiments and implementations reference examples, it should be understood by those of ordinary skill in the art that other danger monitoring or mitigation devices and servers could be intermixed or substituted with those provided. In places where the description above refers to particular embodiments of danger monitoring systems and methods, it should be readily apparent that a number of modifications may be made without departing from the spirit thereof and that these embodiments and implementations may be applied to other to danger monitoring systems as well. Accordingly, the disclosed subject matter is intended to embrace all such alterations, modifications and variations that fall within the spirit and scope of the disclosure and the knowledge of one of ordinary skill in the art.

What is claimed is:

1. A danger monitoring system, comprising:
   a first danger monitoring device communicatively coupled to a network, comprising:
   a microphone configured to continuously digitize environmental sound;
   a first memory storing an interval of the most recently digitized environmental sound, and storing a location identifier associated with the location of the danger monitoring device;
   a first processor configured to determine whether the stored interval of digitized sound meets a threshold criteria for a dangerous event; and
   a first network interface configured to send a first danger observation data generated in response to a determination that the stored interval of digitized sound meets the threshold criteria, the first danger observation data comprising an audio data associated with a digitized dangerous event, a timestamp associated with the event, and the location identifier obtained in response to the determination that the stored interval meets the threshold criteria;
   a danger monitoring server communicatively coupled to the network, comprising:
   a second memory storing the first danger observation data received by the danger monitoring server from the first danger monitoring device, the first danger observation data being stored among a plurality of danger observation data in the second memory;
   a second processor configured to:
   verify the dangerous event digitized by the first danger monitoring device by comparing the audio data of the first danger observation data with the audio data of any danger observation data of the plurality of danger observation data whose timestamp has a proximity with the timestamp of the first danger observation data within a temporal threshold; and
   determine an event location of the verified dangerous event using the location identifiers and timestamps of the first danger observation data and any danger observation data of the plurality whose temporal proximity is within the temporal threshold and whose audio data is similar to the audio data of the first danger observation data;
   a second network interface configured to send a danger alert comprising the event location and an event timestamp; and
   a danger mitigation device communicatively coupled to the network, comprising:
   a third network interface configured to receive the danger alert from the danger monitoring server;
   a GPS receiver;
   a screen;
   a third memory comprising map data; and
   a third processor configured to render a map on the screen, the map indicating at least a current location of the danger mitigation device, and the event location.

2. The system of claim 1, wherein the first danger monitoring device is a mobile device.

3. The system of claim 2, wherein the microphone of the first danger monitoring device continuously digitizes environmental sound in response to a daemon.

4. The system of claim 1, wherein the first danger monitoring device is also the danger mitigation device.

5. The system of claim 1, wherein the threshold criteria for a dangerous event is, at least in part, whether the intensity of the environmental sound exceeded a threshold sound intensity during the interval.

6. The system of claim 5, wherein the threshold sound intensity is adjusted before a determination is made regarding the interval, the adjustment correcting for dampening caused by a closed environment and based upon at least one of an orientation of the first danger monitoring device as determined by an accelerometer, and an ambient light level observed by a photosensor of the first danger monitoring device.

7. The system of claim 1, wherein the threshold criteria for a dangerous event is, at least in part, whether the stored interval of digitized sound correlates with at least one of a plurality of digitized sounds stored in the first memory, each of the plurality associated with a different type dangerous event.

8. The system of claim 1, wherein the audio data of the first danger observation data is an acoustic fingerprint of the interval of digitized environmental sound.

9. The system of claim 1, wherein the danger mitigation device is further configured to display navigation information based upon the map data, the current location of the danger mitigation device, and the event location, the navigation information generated by the third processor to reduce danger to a user of the danger mitigation device due to proximity to the dangerous event.

10. The system of claim 9, wherein the danger mitigation device further comprises a camera, and the navigation information is presented in the form of augmented reality.

11. The system of claim 9, wherein the navigation information displayed on the screen of the danger mitigation device includes an avatar chosen from a plurality of avatars and based, at least in part, upon at least one of a specified age of the user and a specified limitation of the user.

12. The system of claim 9, wherein the navigation information is generated by the third processor by determining a path that shields a user of the danger mitigation device from direct line-of-sight with the event location, using at least one structure identified by the map data stored in the third memory.

13. The system of claim 9, wherein the danger mitigation device is configured to display a graphical indicator of a bearing and a distance to the event location relative to the current location of the danger mitigation device.

14. The system of claim 1, wherein the first danger monitoring device is a stationary sound monitoring device, the location identifier is a device identifier, and the danger monitoring server comprises a device table correlating a plurality of device identifiers with physical locations of a plurality of stationary sound monitoring devices.

15. The system of claim 1, wherein the danger monitoring server is unaware of an identity of a user of the first danger monitoring device.

16. The system of claim 1, wherein the first danger observation data further comprises a user identifier, the second memory of the danger monitoring server further comprises an identity table associating each of a plurality of user identifiers with one or more emergency contacts, and wherein the second network interface of the danger monitoring server is further configured to send a status notification to the one or more emergency contacts associated with the user of the danger mitigation device, the status notification comprising a summary of the dangerous event, the timestamp, the event location, and a current status of the user.

17. The system of claim 1, further comprising a civil infrastructure gateway device communicatively coupled to the danger monitoring server, the civil infrastructure gateway device configured to instruct one or more machine-controllable pieces of civil infrastructure located proximate the event location to perform a predefined operation in response to the receipt of the danger alert.

18. A danger monitoring system, comprising:
a first danger monitoring device communicatively coupled to a network, comprising:
 a microphone configured to continuously digitize environmental sound;
 a first memory storing an interval of the most recently digitized environmental sound, and storing a location identifier associated with the location of the first danger monitoring device;
 a first processor configured to determine whether the stored interval of digitized sound meets a threshold criteria for a dangerous event; and
 a first network interface configured to send a first danger observation data generated in response to a determination that the stored interval of digitized sound meets the threshold criteria, the first danger observation data comprising an audio data associated with a digitized dangerous event, a timestamp associated with the event, and the location identifier obtained in response to the determination that the stored interval meets the threshold criteria;
a danger monitoring server communicatively coupled to the network, comprising:
 a second memory storing the first danger observation data received by the danger monitoring server from the first danger monitoring device, the first danger observation data being stored among a plurality of danger observation data in the second memory;
 a second processor configured to:
  verify the dangerous event digitized by the first danger monitoring device by comparing the audio data of the first danger observation data with the audio data of any danger observation data of the plurality of danger observation data whose timestamp has a proximity with the timestamp of the first danger observation data within a temporal threshold; and
  determine an event location of the verified dangerous event using the location identifiers and timestamps of the first danger observation data and any danger observation data of the plurality whose temporal proximity is within the temporal threshold and whose audio data is similar to the audio data of the first danger observation data;
 a second network interface configured to send a danger alert comprising the event location and an event timestamp;
a danger mitigation device communicatively coupled to the network, comprising:
 a third network interface configured to receive the danger alert from the danger monitoring server;
 a screen;
 a GPS receiver;
 a third memory comprising map data; and
 a third processor configured to render a map on the screen, the map indicating at least a current location of the danger mitigation device, and the event location;
a video recording device communicatively coupled to the danger monitoring server, comprising a camera, a fourth processor, a fourth memory, and a fourth network interface;
wherein the video recording device begins retaining recorded video in the memory in response to the danger alert.

19. The system of claim 18, wherein the threshold criteria is a range of sound intensity associated with events having the potential to escalate a conflict involving emergency services.

20. The system of claim 18, wherein the video recording device begins retaining recorded video in response to a signal transmitted by an emergency services radio proximate the video recording device, the video recording device being communicatively coupled to the danger monitoring server through the emergency services radio.

21. The system of claim 18, wherein the video recording device is also the first danger monitoring device, and wherein the video recording device begins retaining recorded video in the memory in response to a determination by the first processor that the threshold criteria has been met.

22. The system of claim 18, wherein the video recording device is a bodycam.

\* \* \* \* \*